(12) United States Patent
Kimura

(10) Patent No.: US 11,598,629 B2
(45) Date of Patent: Mar. 7, 2023

(54) OPTICAL DISPLACEMENT SENSOR

(71) Applicant: MITUTOYO CORPORATION, Kanagawa (JP)

(72) Inventor: Akihide Kimura, Saitama (JP)

(73) Assignee: MITUTOYO CORPORATION, Kanagawa (JP)

(*) Notice: Subject to any disclaimer, the term of this patent is extended or adjusted under 35 U.S.C. 154(b) by 197 days.

(21) Appl. No.: 17/224,546

(22) Filed: Apr. 7, 2021

(65) Prior Publication Data

US 2021/0318114 A1   Oct. 14, 2021

(30) Foreign Application Priority Data

Apr. 14, 2020 (JP) .............................. JP2020-072431
Oct. 14, 2020 (JP) .............................. JP2020-173442

(51) Int. Cl.
*G01B 11/02*   (2006.01)
*G02B 5/26*    (2006.01)
*G02B 5/18*    (2006.01)

(52) U.S. Cl.
CPC .............. *G01B 11/026* (2013.01); *G02B 5/18* (2013.01); *G02B 5/26* (2013.01)

(58) Field of Classification Search
CPC ........ G01B 11/026; G01B 11/02; G02B 5/18; G02B 5/26; G02B 5/04; G02B 27/283; G01D 5/38
See application file for complete search history.

(56) References Cited

U.S. PATENT DOCUMENTS

| | | | | |
|---|---|---|---|---|
| 2013/0114061 A1* | 5/2013 | de Groot | ............. | G03F 7/70775 355/72 |
| 2016/0102999 A1* | 4/2016 | Liesener | ................ | G01D 5/266 356/488 |
| 2016/0146722 A1* | 5/2016 | Koerner | ................ | G01N 21/65 356/497 |

FOREIGN PATENT DOCUMENTS

| | | |
|---|---|---|
| JP | 11-237207 | 8/1999 |
| JP | 2003-156319 | 5/2003 |

* cited by examiner

*Primary Examiner* — Jonathan M Hansen
(74) *Attorney, Agent, or Firm* — Greenblum & Bernstein, P.L.C.

(57) ABSTRACT

An optical displacement sensor includes: a splitting unit that splits the light radiated from the light source into a first light ray and a second light ray; a reflection unit including a first reflection part and a second reflection part provided at a predetermined angle with respect to the first reflection part; and a fold-back reflection unit that folds-back and reflects the light that has gone through the reflection unit to the reflection unit. The optical displacement sensor is characterized in that the reflection unit reflects the first light ray and the second light ray that are split by the splitting unit and have gone through the diffraction unit from the first reflection part to the second reflection part, and reflects the first light ray and the second light ray that are reflected by the fold-back reflection unit from the second reflection part to the first reflection part.

18 Claims, 13 Drawing Sheets

OPTICAL DISPLACEMENT SENSOR

CROSS-REFERENCE TO RELATED APPLICATIONS

This non-provisional application claims priority under 35 U.S.C. § 119(a) from Japanese Patent Application No. 2020-072431, filed on Apr. 14, 2020, and Japanese Patent Application No. 2020-173442, filed on Oct. 14, 2020, the entire contents of which are incorporated herein by reference.

BACKGROUND

Technical Field

The present invention relates to optical displacement sensors.

Background Art

There are conventionally known optical displacement sensors that comprise light sources for radiating light, light-receiving units for receiving light from the light sources and arithmetic units for calculating the amount of displacement of an object to be measured.

For example, a two-dimensional angle sensor (i.e., an optical displacement sensor) described in JP2003-156319A includes a light source for projecting a light beam to an object to be detected, a lens provided in an optical path of the light reflected from the object to be detected by the light beam, and a detection element (i.e., a light-receiving unit) consisting of a photodiode provided near the focal point of the lens. The two-dimensional angle sensor detects the angle of the object to be detected by calculating the photocurrent detected with the detection element.

Specifically, the two-dimensional angle sensor detects the inclination of the object to be detected from the shape of the light projected to the detection element and the magnitude of the light amount of the light. If the shape of the light projected to the detection element and the magnitude of the light amount of the light vary due to a lens or the like, such variation may affect the detection result as noise. Therefore, the two-dimensional angle sensor must be provided with an optical component, such as a high-quality and expensive lens, in order to suppress noise, and there is therefore a problem that it is costly.

For such problem, for example, a laser interferometer is used in JP11-237207A. The laser interferometer measures the amount of change in angle due to the rotation of an object to be measured by utilizing the interference of the laser beams. The laser interferometer includes a laser light source (i.e., a light source), a first optical fiber, a first lens, a polarization beam splitter for detecting an angle of rotation, a polarization plate, a second lens, and a light-receiving signal processing unit (i.e., a light-receiving unit and an arithmetic unit). The laser light source radiates a laser beam. The first optical fiber transmits the laser beam radiated from the laser light source. The first lens collimates the laser beam from the first optical fiber. The polarization beam splitter for rotation angle detection splits the laser beam collimated by the first lens, and combines the split laser beams after passing through two corner cubes. The polarization plate polarizes the laser beams radiated from the polarization beam splitter for rotation angle detection. The second lens converges the laser beams to an end face of the second optical fiber that transmits the laser beams passed through the polarization plate. The light-receiving signal processing unit converts the laser beams passed through the second optical fiber into an electrical signal.

The laser light source is an He—Ne laser that radiates a laser beam with good coherency of the electric signal detected at the light-receiving signal processing unit. The laser beam radiated into the light-receiving signal processing unit through the polarization beam splitter for rotation angle detection then causes interference at a radiated surface of the light-receiving signal processing unit to which the laser beam is radiated. The laser interferometer can measure the amount of change in angle due to the rotation of the object to be measured by converting the change in intensity of the interference signal caused by the change in the optical path length due to the rotation into an electrical signal at the light-receiving signal processing unit and calculating such change in intensity.

Specifically, when the two corner cubes provided in the laser interferometer are rotated, the difference in the optical path length of the two laser beams split by the polarization beam splitter for rotation angle detection changes, and the light-dark change of the interference light (i.e., the composite light), namely, the change in the intensity of the interference signal, is observed. At this time, the change in the difference in the optical path length is twice the length obtained by multiplying the arrangement distance of the two corner cubes by the rotation angle. The laser interferometer can measure the angle due to the rotation of the two corner cubes by detecting the amount of change in the intensity of the interference signal. Therefore, because the laser interferometer performs detection regardless of the shape of the light and the magnitude of the light amount of the light, the laser interferometer can detect the angle of rotation of the object to be measured without an optical component such as a high-quality and expensive lens. It should be noted that the same effect is obtained even if the polarization beam splitter for rotation angle detection is a diffraction grating.

SUMMARY OF THE INVENTION

Problems to be Solved by the Invention

Conventional optical displacement sensors may employ two prisms instead of two corner cubes. A prism is an optical component formed by, for example, connecting two reflection plates, such as mirrors, in an orthogonal manner such that the respective reflection surfaces face one another, whereas a corner cube is an optical component formed by, for example, connecting three reflection plates in an orthogonal manner such that the respective reflection surfaces face one another. Accordingly, the prisms may be manufactured relatively cheaper than the corner cubes. Therefore, conventional optical displacement sensors reduce costs by employing prisms instead of corner cubes.

However, prisms may be manufactured with angular errors, rather than at right angles, when connecting the two reflection plates.

FIG. 13 is a schematic diagram showing an optical path of light in a conventional optical displacement sensor 100. FIGS. 14A and 14B are schematic diagrams showing optical paths of light when two prisms have angular errors in conventional optical displacement sensors 100A and 100B. Specifically, FIG. 14A shows an optical path of light observed in the optical displacement sensor 100A when two prisms have angular errors and thus, two reflection plates of each prism are connected at an acute angle α. FIG. 14B shows an optical path of light observed in the optical displacement sensor 100B when two prisms have angular errors and thus, two reflection plates of each prism are connected at an obtuse angle β. It should be noted that the optical path of the light from the light source 300 to the light-receiving unit 400 is indicated by a solid arrow in FIGS. 13, 14A and 14B.

As shown in FIGS. 13, 14A and 14B, the optical displacement sensor 100, 100A, 100B includes: a diffraction grating 200; a light source 300; a light-receiving unit 400 for receiving light from the light source 300 through the diffraction grating 200; two prisms 500, 500A, 500B, each formed by connecting reflection surfaces of two reflection plates such that the surfaces face each other; and one prism 600 for retroreflecting the light went through the two prisms 500, 500A, 500B to the two prisms 500, 500A, 500B. Two light rays obtained by light radiated from the light source 300 being split by the diffraction grating 200 go through the two prisms 500, 500A, 500B and radiate into the diffraction grating 200 again. The two light rays radiated into the diffraction grating 200 are diffracted and output toward the prism 600. The two light rays radiated into the prism 600 are offset in the depth direction or frontward direction of the drawing sheet and are then radiated into the diffraction grating 200 again. The two light rays radiated into the diffraction grating 200 go through the two prisms 500, 500A, 500B and are then radiated into the diffraction grating 200 again. The two light rays are radiated into the light-receiving unit 400 as a single composite light ray having an overlap through diffraction by the diffraction grating 200.

Then, when the two prisms have angular errors, the optical path of the light changes. Namely, the optical path of the light indicated by the solid arrow changes when the two reflection plates of each of the two prisms 500A are connected at an acute angle α in the optical displacement sensor 100A shown in FIG. 14A and when the two reflection plates of each of the two prisms 500B are connected at an obtuse angle β in the optical displacement sensor 100B shown in FIG. 14B.

More specifically, as shown in FIG. 14A, when the two prisms 500A are formed with acute angles α, the travelling directions of the two light rays obtained by the light radiated from the light source 300 being split by the diffraction grating 200 are inclined by going through the two prisms 500A, and the light rays become offset from each other and radiate into the light-receiving unit 400 with a distance S1 therebetween.

Further, as shown in FIG. 14B, when the two prisms 500B are formed with obtuse angles β, the travelling directions of the two light rays obtained by the light radiated from the light source 300 being split by the diffraction grating 200 are inclined by going through the two prisms 500B, and the light rays become offset from each other and radiate into the light-receiving unit 400 with a distance S2 therebetween.

At this time, the amount of overlap of the two light rays in the composite light radiated into the light-receiving unit 400 in FIGS. 14A and 14B becomes small relative to that of the optical displacement sensor 100 shown in FIG. 13. Specifically, the amount of interference light generated in the light-receiving unit 400 is small in the optical displacement sensors 100A and 100B respectively including the two prisms 500A and 500B having the angle errors shown in FIGS. 14A and 14B as compared with that of the optical displacement sensor 100 including two prisms 500 having no angle error shown in FIG. 13, and the amplitude of the obtainable interference signal is therefore attenuated. Accordingly, conventional optical displacement sensors suffer from the problem to the effect that a stable detection cannot be performed since the amount of overlap in the composite light radiated into the light-receiving unit 400 changes if the conventional optical displacement sensors are provided with prisms having angular errors, such as an acute angle or an obtuse angle, rather than a right angle.

An object of the present invention is to provide an optical displacement sensor capable of detecting the amount of displacement of an object to be measured with high precision while stabilizing the amount of overlap in the composite light radiated into the light-receiving unit.

Means for Solving the Problems

The optical displacement sensor of the present invention includes: a diffraction unit having diffraction gratings arranged at a predetermined period along a measurement direction; a light source that radiates light to the diffraction unit; and a light-receiving unit that receives light that has gone through the diffraction unit. The optical displacement sensor includes: a splitting unit that splits the light radiated from the light source into a first light ray and a second light ray that is different from the first light ray; a reflection unit having a first reflection part that reflects the light radiated from the light source and a second reflection part provided at a predetermined angle with respect to the first reflection part; and a fold-back reflection unit that folds-back and reflects the light that has gone through the reflection unit to the reflection unit. The reflection unit reflects the first light ray and the second light ray that are split by the splitting unit and have gone through the diffraction unit from the first reflection part to the second reflection part, and reflects the first light ray and the second light ray that are reflected by the fold-back reflection unit from the second reflection part to the first reflection part. The light-receiving unit receives the first light ray and the second light ray that have gone through the reflection unit and the fold-back reflection unit.

According to such present invention, the reflection unit in the optical displacement sensor reflects the first light ray and the second light ray that are split by the splitting unit and have gone through the diffraction unit from the first reflection part to the second reflection part, and reflects the first light ray and the second light ray that are reflected by the fold-back reflection unit from the second reflection part to the first reflection part. Further, the diffraction unit diffracts the light a total of four times by causing the light to go through the fold-back reflection unit: when outputting the light incident from the light source to the reflection unit; when outputting the light incident from the reflection unit to the fold-back reflection unit; when outputting the light incident from the fold-back reflection unit to the reflection unit; and when outputting the light incident from the reflection unit to the light-receiving unit. The optical displacement sensor compensates for the variation in the travelling direction of the light due to the angular error in the reflection unit: by diffracting the light from the light source by the diffraction unit four times; and by causing the first light ray and the second light ray, which have been reflected once by the reflection unit, to follow, by way of the fold-back reflection unit, the optical paths in a direction reverse from the direction in which the previous reflection occurred. This enables the optical displacement sensor to compensate for the deviation in the optical paths of the first light ray and the second light ray and the variation in the radiated position in the light-receiving unit caused by the angular error in the reflection unit. The optical displacement sensor is enabled to suppress reduction in the amount of overlap in the composite light caused by the offset of the first light ray and the second light ray constituting the composite light radiated into the light-receiving unit.

Therefore, the optical displacement sensor is enabled to detect the amount of displacement of the object to be measured with high precision while stabilizing the amount of overlap in the composite light radiated into the light-receiving unit.

Further, the conventional optical displacement sensor is provided with, for example, two corner cubes (optical components) respectively corresponding to the first light ray and the second light ray split by the splitting unit. In contrast, according to the configuration of the present invention, the optical displacement sensor is enabled to deal with the first light ray and the second light ray with a single reflection unit (optical component) since the first light ray and the second light ray that are split by the splitting unit and have gone through the diffraction unit are reflected from the first reflection part to the second reflection part, and the first light ray and the second light ray that are reflected by the fold-back reflection unit are reflected from the second reflection part to the first reflection part.

Therefore, the optical displacement sensor is enabled to reduce the number of optical components corresponding to the light rays split by the splitting unit, and thereby costs may be reduced.

The optical displacement sensor of the present invention includes: a diffraction unit having diffraction gratings arranged at a predetermined period along a measurement direction; a light source that radiates light to the diffraction unit; and a light-receiving unit that receives light that has gone through the diffraction unit. The optical displacement sensor includes: a splitting unit that splits the light radiated from the light source into a first light ray and a second light ray that is different from the first light ray at a predetermined splitting point, and that outputs each of the first light ray and the second light ray in a direction that is in plane symmetry with respect to a plane including the splitting point; and a reflection unit having a first reflection part that reflects the light radiated from the light source and a second reflection part provided at a predetermined angle with respect to the first reflection part. The reflection unit includes: a first reflection unit including the second reflection part provided at a predetermined angle with respect to the first reflection part; a second reflection unit that is different from the first reflection unit and that includes the second reflection part provided at the same angle as the predetermined angle in the first reflection unit with respect to the first reflection part. The first reflection unit and the second reflection unit are provided so that the first reflection parts and the second reflection parts are arranged in plane symmetry with respect to the plane including the splitting point, the plane being defined as a symmetry plane. The first reflection part of the first reflection unit is incident with one of the first light ray and the second light ray output from the splitting unit and reflects the incident light to the second reflection part of the first reflection unit. The first reflection part of the second reflection unit is incident with the other one of the first light ray and the second light ray output from the splitting unit and reflects the incident light to the second reflection part of the second reflection unit. The light-receiving unit receives the first light ray and the second light ray that have gone through the first reflection unit and the second reflection unit.

According to such present invention, the splitting unit in the optical displacement sensor outputs each of the first light ray and the second light ray in a direction that is in plane symmetry with respect to the plane including the splitting point, the first reflection part of the first reflection unit is incident with one of the first light ray and the second light ray output from the splitting unit and reflects the incident light ray to the second reflection part of the first reflection unit, the first reflection part of the second reflection unit is incident with the other one of the first light ray and the second light ray output from the splitting unit and reflects the incident light ray to the second reflection part of the second reflection unit. Namely, the first reflection unit and the second reflection unit are provided so that the first reflection parts and the second reflection parts are arranged in plane symmetry with respect to the plane including the splitting point, the plane being defined as a plane of symmetry, and reflect the first light ray and the second light ray by causing them to follow, in each reflection unit, the optical paths from the first reflection part to the second reflection part. This enables the optical displacement sensor to compensate for the deviation in the optical paths of the first light ray and the second light ray and the variation in the radiated position in the light-receiving unit caused by the angular error common to the first reflection unit and the second reflection unit. The optical displacement sensor is enabled to suppress reduction in the amount of overlap in the composite light caused by the offset of the first light ray and the second light ray constituting the composite light radiated into the light-receiving unit.

Therefore, the optical displacement sensor is enabled to detect the amount of displacement of the object to be measured with high precision while stabilizing the amount of overlap in the composite light radiated into the light-receiving unit.

In this case, the optical displacement sensor is preferably provided with a fold-back reflection unit that folds-back and reflects the light that has gone through the reflection unit to the reflection unit.

According to such configuration, the optical displacement sensor having the first reflection unit and the second reflection unit causes, by including the fold-back reflection unit, the first light ray and the second light ray, which have been reflected once by the reflection unit, to follow and reflect along, by way of the fold-back reflection unit, the optical paths in a direction reverse from the direction in which the previous reflection occurred. This enables the optical displacement sensor to compensate for the deviation in the optical paths of the first light ray and the second light ray and the variation in the radiated position in the light-receiving unit caused by the angular error in the first reflection unit and the second reflection unit. The optical displacement sensor is enabled to suppress reduction in the amount of overlap in the composite light caused by the offset of the first light ray and the second light ray constituting the composite light radiated into the light-receiving unit.

Therefore, the optical displacement sensor is enabled to detect the amount of displacement of the object to be measured with high precision while stabilizing the amount of overlap in the composite light radiated into the light-receiving unit.

In this case, each of the first reflection part and the second reflection part in the optical displacement sensor includes a reflection surface that reflects light. Each of the first reflection unit and the second reflection unit has a first intersection line. The first intersection line is a line along which extension surfaces obtained by extending the respective reflection surfaces of the first reflection part and the second reflection part intersect one another. The first intersection line of the first reflection unit and the first intersection line of the second reflection unit are arranged on the plane including the splitting point. The fold-back reflection unit includes: a first reflection plate that reflects the light; a second reflection plate provided at a predetermined angle with respect to the first reflection plate; and a second intersection line. The second intersection line is a line along which extension surfaces obtained by extending each of the first reflection plate and the second reflection plate intersect one another. It is preferable for the fold-back reflection unit that the second intersection line is arranged parallel to a direction orthogonal to the first intersection line.

Here, as described above, the fold-back reflection unit is for compensating for the variation in the travelling direction of the light by diffracting the light from the light source by the diffraction unit four times and by causing the first light ray and the second light ray, which have been reflected once by the reflection unit, to follow and reflect along the optical paths in a direction reverse from the direction in which the previous reflection occurred. It is therefore preferable for no further variation to be introduced to the traveling direction of the light by going through the fold-back reflection unit. Further, if the fold-back reflection unit is a single reflection plate such as a mirror, when the light incident from the diffraction unit is reflected in a direction reverse from the direction of the incident light and is caused to follow the optical path in a direction reverse from the direction in which the previous reflection occurred without offset, problems arise such as the incoming light and the outgoing light interfering with each other, and the light source and the light-receiving unit being required to be located at the same position.

However, according to such configuration, the fold-back reflection unit is enabled to offset the first light ray and the second light ray in a direction parallel to the first intersection line since the second intersection line is arranged parallel to the direction orthogonal to the first intersection line. This enables the optical displacement sensor to prevent the incoming light and the outgoing light from interfering with each other, and to locate the light source and the light-receiving unit at different positions, for example, positions spaced apart in a direction parallel to the first intersection line. Further, the inclusion of the fold-back reflection unit with such configuration enables the optical displacement sensor to offset the first light ray and the second light ray in a direction parallel to the first intersection line and fold-back and reflect the light that has gone through the reflection unit to the reflection unit without introducing a new variation in the traveling directions of the first light ray and the second light ray. Therefore, the optical displacement sensor is enabled to stabilizes the composite light to be received by the light-receiving unit in order to achieve high precision.

In this case, the splitting unit preferably corresponds to diffraction gratings included in the diffraction unit.

According to such configuration, the splitting unit corresponds to the diffraction gratings included in the diffraction unit and there is therefore no need to newly provide an optical component for splitting the light from the light source. This enables the optical displacement sensor to use the diffraction gratings of the diffraction unit also as the splitting unit, and thereby costs may be reduced.

Alternatively, the splitting unit is preferably a beam splitter that splits the light from the light source into two light rays that are different from each other.

Here, if the splitting unit is a diffraction grating, the light from the light source that has gone through the diffraction grating becomes a plurality of diffracted light rays. The plurality of diffracted light rays include a diffracted light ray traveling in the same direction as the optical axis of the light ray radiated from the light source, diffracted light rays traveling at predetermined diffraction angles on both sides of the optical axis, and diffracted light rays traveling at diffraction angles greater than the predetermined diffraction angles on both sides of the optical axis. If the diffracted light ray traveling in the same direction as the optical axis is assumed to be the zero-order diffracted light ray, then the plurality of diffracted light rays may be ordered as plus and minus first order diffracted light rays, plus and minus second order diffracted light rays, and so on, in the direction in which the diffraction angle becomes greater with respect to the reference zero-order diffracted light ray.

The optical displacement sensor detects the amount of displacement of the object to be measured based on the composite light generated mainly from the plus and minus first order diffracted light rays. Since the diffracted light rays other than the plus and minus first order diffracted light rays are not used in the optical displacement sensor, loss may occur in the light used for detecting the amount of displacement of the object to be measured.

However, according to such configuration, the splitting unit is a beam splitter that splits the light from the light source into two light rays that are different from each other and does not split the light from the light source into a plurality of diffracted light rays as in the diffraction grating, and loss in the light used for detecting the amount of displacement of the object to be measured may therefore be prevented.

Specifically, types of beam splitters include a non-polarization beam splitter and a polarization beam splitter, and they have the following characteristics. The non-polarization beam splitter is an optical component that splits light from a light source into two light rays as averaged non-polarized light rays. The polarization beam splitter is an optical component that separates light from a light source into two polarization components: S-polarized light, which is S-randomly polarized light, and P-polarized light, which is P-randomly polarized light. Namely, both the non-polarization beam splitter and the polarization beam splitter are optical components that split the light from the light source into two light rays. Accordingly, the employment of a beam splitter for the diffraction unit enables the optical displacement sensor to suppress the loss of light used for detecting the amount of displacement of the object to be measured as compared with the case of employing a diffraction grating, and the amount of displacement of the object to be measured may therefore be detected with high precision.

In this case, the optical displacement sensor is preferably provided with a total reflection unit that totally reflects the first light ray and the second light ray in order to change the directions of the optical paths of the first light ray and the second light ray to predetermined directions.

Such configuration enables the optical path of light within the optical displacement sensor to be freely designed since the optical displacement sensor includes the total reflection unit that changes the directions of the optical paths of the first light ray and the second light ray to the predetermined directions. Further, the size of the optical displacement sensor may be reduced depending on the arrangement of the total reflection unit.

In this case, the optical displacement sensor includes an arithmetic unit that calculates the amount of displacement of the object to be measured based on the light received by the light-receiving unit. The diffraction unit is attached to the object to be measured that moves in the measurement direction, and moves in synchronization with the movement of the object to be measured. The arithmetic unit preferably calculates, in association with the movement of the diffraction unit that moves in synchronization with the movement of the object to be measured, the amount of displacement due to the movement of the object to be measured detected from the light received by the light-receiving unit.

Such configuration enables the optical displacement sensor to serve as a linear motion sensor that detects the amount of movement of the object to be measured that moves in the measurement direction.

Further, the optical displacement sensor includes an arithmetic unit that calculates the amount of displacement of the object to be measured based on the light received by the light-receiving unit. The diffraction unit is attached to the object to be measured that rotates around a predetermined axis, the predetermined axis being defined as a rotation axis, and rotates in synchronization with the rotation of the object to be measured. The arithmetic unit preferably calculates, in association with the rotation of the diffraction unit that rotates in synchronization with the rotation of the object to be measured, the amount of angle displacement based on the change in phase detected from the light received by the light-receiving unit.

Such configuration enables the optical displacement sensor to serve as an angle sensor that detects the amount of angle displacement of the object to be measured that rotates around the predetermined axis, which is the rotation axis.

In this case, the diffraction unit is preferably of a transmissive type that diffracts and transmits the light from the light source.

Regardless of whether the optical displacement sensor serves as an angle sensor or a linear motion sensor, such configuration enables the diffraction unit to be compatible with both angle sensor and linear motion sensor by being of a transmissive type.

Further, the diffraction unit is preferably of a reflective type that diffracts and reflects the light from the light source.

If the optical displacement sensor serves as a linear motion sensor, such configuration enables the diffraction unit to function effectively by being of a reflective type. Further, the reflective diffraction unit allows for the easy designing of the optical displacement sensor relative to the case where the diffraction unit is of a transmissive type from the viewpoint of ease of designing the equipment, such as optical components to be attached.

DETAILED DESCRIPTION OF THE EMBODIMENTS

First Embodiment

Hereinafter, the first embodiment of the present invention will be described with reference to FIGS. 1 to 6.

Figure 1:
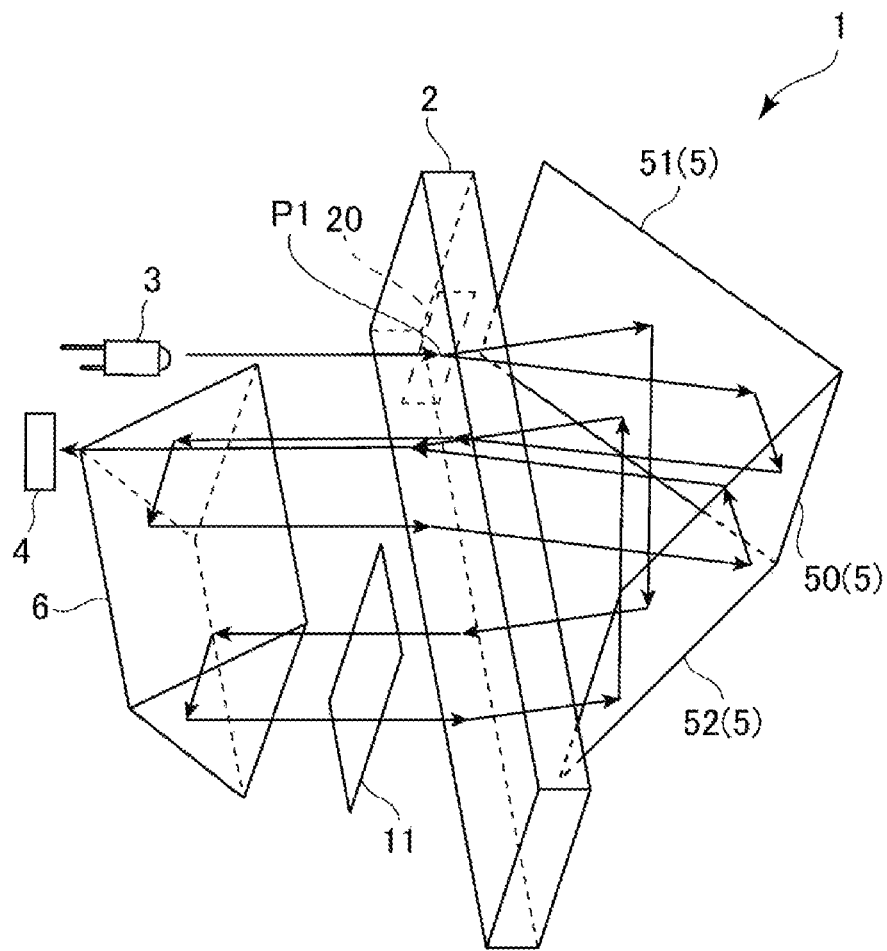
FIG. 1 is a perspective view showing an optical displacement sensor according to a first embodiment.
Figure 1:
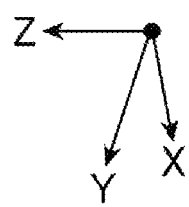
Figure 2A:
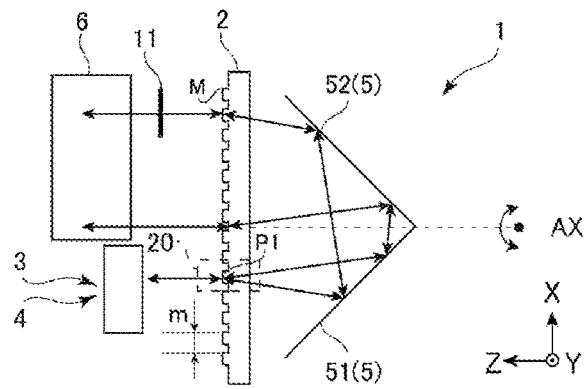
FIGS. 2A to 2C are schematic diagrams showing an optical path of light when the optical displacement sensor is an angle sensor.
Figure 2B:
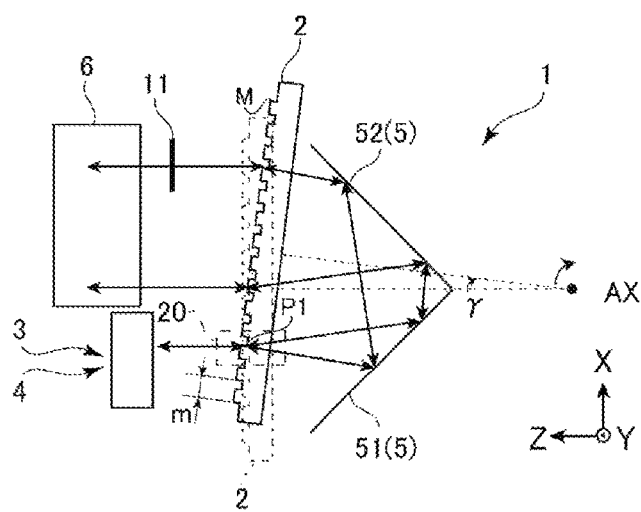
Figure 2C:
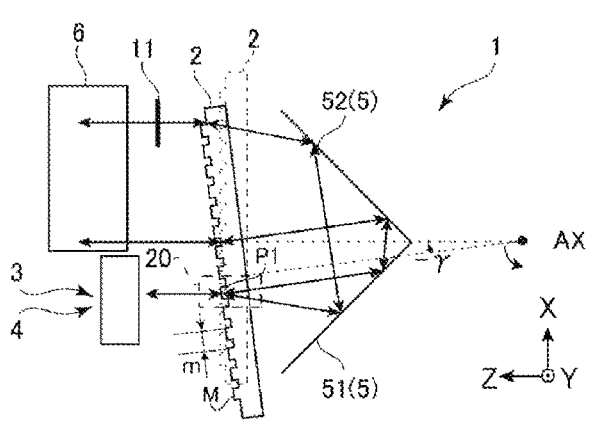

FIG. 1 is a perspective view showing an optical displacement sensor 1 according to the first embodiment. FIGS. 2A to 2C are schematic diagrams showing an optical path of light when the optical displacement sensor 1 is an angle sensor. Specifically, FIG. 2A shows a state prior to an object to be measured being rotated in the optical displacement sensor 1. FIGS. 2B and 2C show a state in which the object to be measured is rotated in a predetermined direction in the optical displacement sensor 1.

As shown in FIGS. 1 and 2A to 2C, the optical displacement sensor 1 includes: a diffraction unit 2 with diffraction gratings M; a light source 3 for radiating light to the diffraction unit 2; and a light-receiving unit 4 for receiving light that has gone through the diffraction unit 2.

The optical displacement sensor 1 is an angle sensor provided inside a measuring apparatus for measuring an object (not shown) that rotates forward and backward. In the present embodiment, the direction in which the diffraction gratings M are arranged in parallel in the diffraction unit 2 is defined as the X direction, being the measurement direction, and the direction orthogonal to the X direction in the plane in which the diffraction gratings M are arranged in parallel in the diffraction unit 2 is defined as the Y direction. The object to be measured is then disposed on the opposite side (the right side in the drawing sheet) to the diffraction unit 2 across a reflection unit 5 (to be described later) and rotates around the Y-axis parallel to the Y-direction, and the Y-axis is therefore the rotation axis AX. It should be noted that the Y-axis will be described as the rotation axis AX of the object to be measured in the following description. Further, for convenience of description, the diffraction gratings M are omitted in FIG. 1 and instead shown in FIGS. 2A to 2C.

The diffraction unit 2 is a transmissive diffraction grating that transmits light and is made of translucent glass. The diffraction unit 2 is not limited to glass, but may be made of any translucent material. The diffraction unit 2 is attached to the object to be measured that rotates around the Y-axis, being a predetermined axis (therefore, the Y-axis is the rotation axis AX), and rotates in a synchronous manner with the rotation of the object to be measured.

The diffraction gratings M in the present embodiment are arranged at a predetermined period m along the X direction, being the measurement direction. Light from the light source 3 that has gone through the diffraction gratings M becomes a plurality of diffracted light rays.

Here, as described above, when the diffracted light ray traveling in the same direction as the optical axis is assumed to be the zero-order diffracted light ray, then the plurality of diffracted light rays may be ordered as plus and minus first order diffracted light rays, plus and minus second order diffracted light rays, and so on, in the direction in which the diffraction angle becomes greater with respect to the reference zero-order diffracted light ray.

The light-receiving unit 4 detects an interference signal from the composite light generated mainly from the plus and minus first order diffracted light rays.

Hereinafter, the optical path of the light that generates the composite light in the light-receiving unit 4 will be represented by a solid arrow in the drawings and the solid arrow will be described as the optical path of the light that generates the composite light in the light-receiving unit 4 in the description.

The optical displacement sensor 1 includes a splitting unit 20 for splitting the light radiated from the light source 3 into a first light ray and a second light ray that is different from the first light ray. Specifically, the splitting unit 20 corresponds to diffraction gratings M in the diffraction unit 2. The splitting unit 20 corresponds to at least one diffraction grating M provided in an area radiated by the light from the light source 3, among the plurality of diffraction gratings M provided on the diffraction unit 2. The diffraction unit 2 may include a plurality of sheets, rather than a single sheet. In this case, the splitting unit 20 may be provided separately from the diffraction unit 2.

The light source 3 radiates light having a constant width to the diffraction unit 2. The light source 3 is, for example, a semiconductor laser. The light source 3 is not limited to a semiconductor laser and it may be any light source as long as it has a coherent length capable of generating interference light in the optical displacement sensor.

The light-receiving unit 4 will be described later with reference to FIGS. 5 and 6.

The optical displacement sensor 1 further includes a reflection unit 5 for reflecting light radiated from the light source 3 and a fold-back reflection unit 6 for folding and reflecting back the light that has gone through the reflection unit 5 to the reflection unit 5.

The reflection unit 5 and the fold-back reflection unit 6 are fixedly provided, without being rotated, in the optical displacement sensor 1.

The reflection unit 5 includes a plate-shaped first reflection part 51 for reflecting light radiated from the light source 3 and a plate-shaped second reflection part 52 provided at a predetermined angle with respect to the first reflection part 51.

The reflection unit 5 is specifically a prism having two reflection surfaces, being the first reflection part 51 and the second reflection part 52. The reflection unit 5 includes a linear connection part 50 which is a line of intersection on the extension surfaces of the first reflection part 51 and the second reflection part 52 and which is formed by connecting the first reflection part 51 and the second reflection part 52.

The connection part 50 is arranged so as to be parallel to the Y direction orthogonal to the X direction, being the measurement direction, in the plane on which the diffraction gratings M of the diffraction unit 2 are arranged in parallel. The reflection unit 5 may not need to be a prism as long as it has a first reflection part 51 and a second reflection part 52. For example, the first reflection part 51 and the second reflection part 52 may be two separate mirrors that are not connected at the connection part 50. In addition, the first reflection part 51 and the second reflection part 52 may not need to be flat but may be solid, for example. Further, the reflection unit 5 may be a beam splitter, a cat's eye using spherical beads, or the like.

The fold-back reflection unit 6 is a single member for reflecting the first light ray and the second light ray to the reflection unit 5, and is a prism having two reflection surfaces orthogonal to each other. The fold-back reflection unit 6 may be a mirror or other reflecting members, instead of a prism, as long as it can reflect the first light ray and the second light ray to the reflection unit 5. The reason why the fold-back reflection unit 6 is preferably a prism will be described later.

The reflection unit 5 reflects the first light ray and the second light ray that are split by the splitting unit 20 and have gone through the diffraction unit 2 from the first reflection part 51 to the second reflection part 52 and then reflects the first light ray and the second light ray that are reflected by the fold-back reflection unit 6 from the second reflection part 52 to the first reflection part 51. Then, the light-receiving unit 4 receives the first light ray and the second light ray that have gone through both the reflection unit 5 and the fold-back reflection unit 6.

The optical displacement sensor 1 includes an arithmetic unit (not shown) for calculating, based on the light received by the light-receiving unit 4, the amount of angle displacement in the object to be measured that rotates around the rotation axis AX.

The arithmetic unit calculates, in association with the rotation of the diffraction unit 2 that rotates in synchronization with the rotation of the object to be measured, the amount of angle displacement based on the change in phase detected from the composite light received by the light-receiving unit 4.

Hereinafter, the optical path of the light in the optical displacement sensor 1 will be described with reference to FIGS. 2A, 2B and 2C. FIGS. 2B and 2C represent the position of the diffraction unit 2 prior to the object to be measured being rotated shown in FIG. 2A by a broken line.

First, as shown in FIGS. 2A, 2B and 2C, the light radiated from the light source 3 is split and diffracted into a first light ray and a second light ray at a splitting point P1 of the splitting unit 20 and radiated from the splitting point P1 onto the first reflection part 51 of the reflection unit 5. At this time, as shown in FIG. 2B, when the object to be measured is rotated in the γ direction, the diffraction unit 2 is also rotated in the γ direction in synchronization and the traveling directions of the first light ray and the second light ray also vary according to the rotation of the diffraction unit 2 in the γ direction. Further, as shown in FIG. 2C, when the object to be measured is rotated in the −γ direction, the diffraction unit 2 is also rotated in the −γ direction in synchronization and the traveling directions of the first light ray and the second light ray also vary according to the rotation in the −γ direction of the diffraction unit 2.

The first reflection part 51, upon which the first light ray and the second light ray are incident, then reflects the first light ray and the second light ray to the second reflection part 52. The second reflection part 52 reflects the first light ray and the second light ray that are incident thereupon to the diffraction unit 2. The first light ray and the second light ray reflected by the second reflection part 52 are diffracted by the diffraction gratings M of the diffraction unit 2 and are output to the fold-back reflection unit 6. The first light ray and the second light ray output from the diffraction unit 2 are offset in the Y direction by the fold-back reflection unit 6 and are retroreflected to the diffraction unit 2 in the directions parallel to and reverse from the directions of the respective first light ray and second light ray when they are output from the diffraction unit 2.

The first light ray and the second light ray retroreflected by the fold-back reflection unit 6 are re-diffracted by the diffraction gratings M of the diffraction unit 2 and are output to the second reflection part 52 of the reflection unit 5. The second reflection part 52, upon which the first light ray and the second light ray are incident, reflects the first light ray and the second light ray to the first reflection part 51. The first reflection part 51 reflects the first light ray and the second light ray incident from the second reflection part 52 to the diffraction unit 2. The first light ray and the second light ray output from the first reflection part 51 are diffracted and combined into composite light by the diffraction gratings M of the diffraction unit 2 and the composite light is output to the light-receiving unit 4. The light-receiving unit 4 receives the composite light consisting of the first light ray and the second light ray that have gone through both the reflection unit 5 and the fold-back reflection unit 6. The arithmetic unit calculates the amount of angle displacement based on the change in phase detected from the composite light received by the light-receiving unit 4.

Figure 3A:
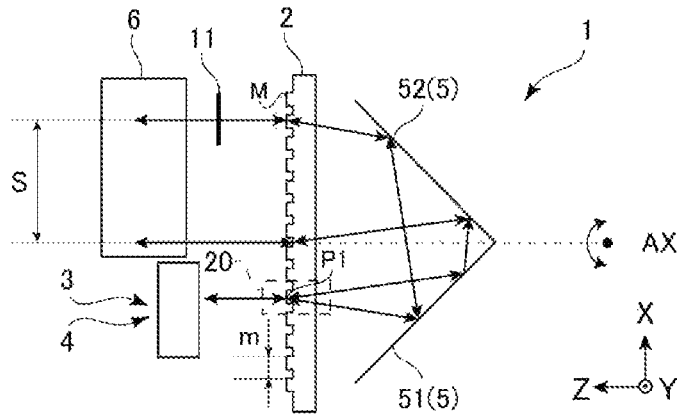
FIGS. 3A to 3C are schematic diagrams showing an optical path of light when a reflection unit in the optical displacement sensor has an angular error.
Figure 3B:
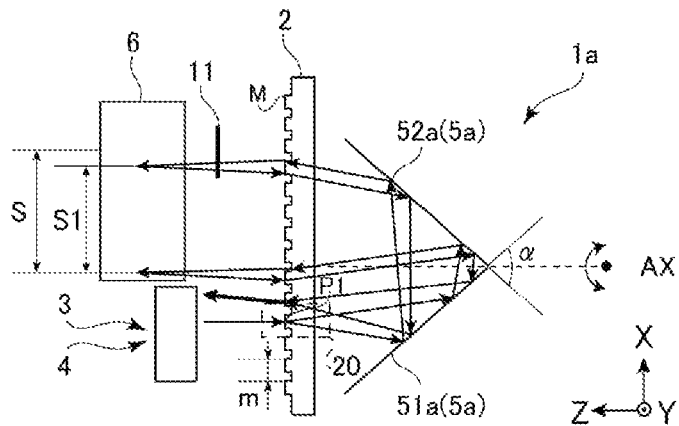
Figure 3C:
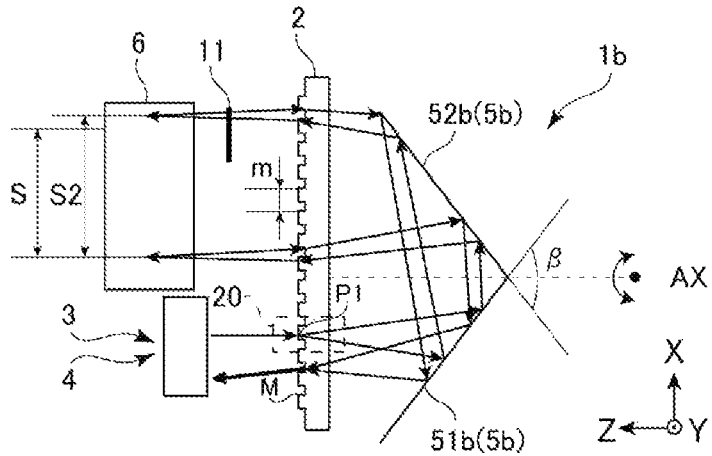

FIGS. 3A to 3C are schematic diagrams showing an optical path of light when the reflection unit 5 in the optical displacement sensor 1 has an angular error. Specifically, FIG. 3A shows an optical path of the light observed in the optical displacement sensor 1 when the reflection unit 5 does not have an angular error. FIG. 3B shows an optical path of the light observed in the optical displacement sensor 1*a* when the reflection unit 5*a* is formed with an acute angle α and thus has an angular error. FIG. 3C shows an optical path of the light observed in the optical displacement sensor 1*b* when the reflection unit 5*b* is formed with an obtuse angle β and thus has an angular error.

As shown in FIG. 3A, when the reflection unit 5 in the optical displacement sensor 1 does not have an angular error, the first light ray and the second light ray radiate into the fold-back reflection unit 6 with a distance S therebetween. As shown in FIG. 3B, when the reflection unit 5*a* in the optical displacement sensor 1*a* is formed with an acute angle α and thus has an angular error, the first light ray and the second light ray are offset by the fold-back reflection unit 6 and are radiated with a distance S1 that is different from the distance S. Further, as shown in FIG. 3C, when the reflection unit 5*b* in the optical displacement sensor 1*b* is formed with an obtuse angle β and thus has an angular error, the first light ray and the second light ray are offset by the fold-back reflection unit 6 and radiated with a distance S2 that is different from the distance S.

By the diffraction unit 2 re-diffracting the first light ray and the second light ray that have reached the fold-back reflection unit 6, the optical displacement sensor 1*a*, 1*b* compensates for the reduction in the amount of overlap due to the distance S1, S2 in the composite light formed of the first light ray and the second light ray received by the light-receiving unit 4.

Specifically, the optical displacement sensor 1*a*, 1*b* subjects the first light ray and the second light ray to diffraction by the diffraction unit 2 a total of four times by causing the first light ray and the second light ray to go through the fold-back reflection unit 6 so that they follow, in the reverse direction, the same optical paths as those of the first light ray and the second light ray to the fold-back reflection unit 6. Thereby, the optical displacement sensor 1*a*, 1*b* compensates for the variation in the travelling direction of the diffracted light due to the angular errors in the reflection unit 5*a*, 5*b*.

The fold-back reflection unit 6 retroreflects the first light ray and the second light ray back to the diffraction unit 2 in parallel and reverse directions. Then, the first light ray and the second light ray diffracted by the diffraction unit 2 are retroreflected by the reflection units 5*a*, 5*b* and follow, in the reverse direction, the same optical paths as those of the first light ray and the second light ray path to the fold-back reflection unit 6, and are diffracted by the diffraction unit 2 so as to become composite light.

At this time, if the fold-back reflection unit 6 is a mirror, and it reflects the first light ray and the second light ray without offset in the Y direction and causes them to follow, in the reverse direction, the same optical paths as those of the first light ray and the second light ray to the fold-back reflection unit 6, the composite light travels coaxially with the light radiated from the light source 3. In this case, the light from the light source 3 and the first and second light rays that have gone through the fold-back reflection unit 6 will interfere with each other and the light-receiving unit 4 therefore cannot receive the composite light. Further, if the first light ray and the second light ray are offset and reflected in a direction that is different from the Y direction, the first light ray and the second light ray may be radiated in a direction deviating from the light-receiving unit 4 depending on the direction of the offset. In this case as well, unless the first light ray and the second light ray are radiated into the light-receiving unit 4, the light-receiving unit 4 may not be able to receive the composite light.

For this reason, as shown in FIG. 1, the fold-back reflection unit 6, which is a prism, is formed by connecting two reflection surfaces on a straight line parallel to the X direction, which is the measurement direction. As such, the fold-back reflection unit 6 offsets and reflects the first light ray and the second light ray in the Y direction. Therefore, the composite light is prevented from traveling coaxially with the light from the light source, and the first light ray and the second light ray are prevented from being radiated in a direction deviating from the light-receiving unit 4. It should be noted that the fold-back reflection unit may not need to offset the first light ray and the second light ray in the Y direction and it may offset them in any direction as long as the light-receiving unit can receive the composite light. Accordingly, the fold-back reflection unit may be a mirror or other reflection members, instead of a prism, and may be any unit as long as it can reflect the first light ray and the second light ray.

Figure 4A:
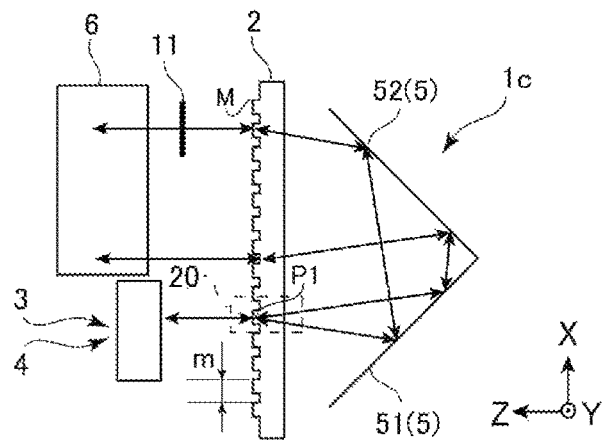
FIGS. 4A to 4C are schematic diagrams showing an optical path of light when the optical displacement sensor is a linear motion sensor.
Figure 4B:
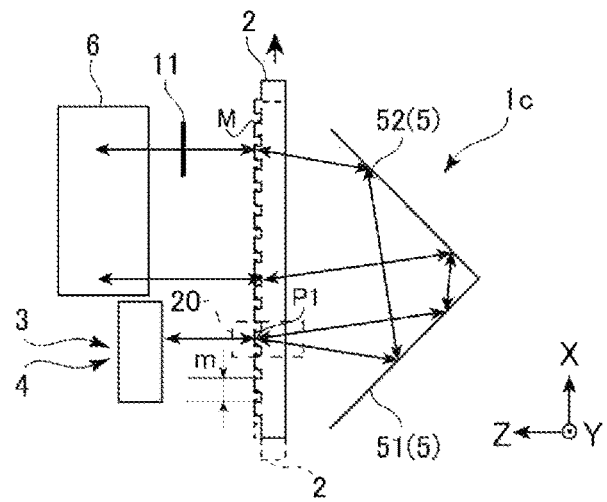
Figure 4C:
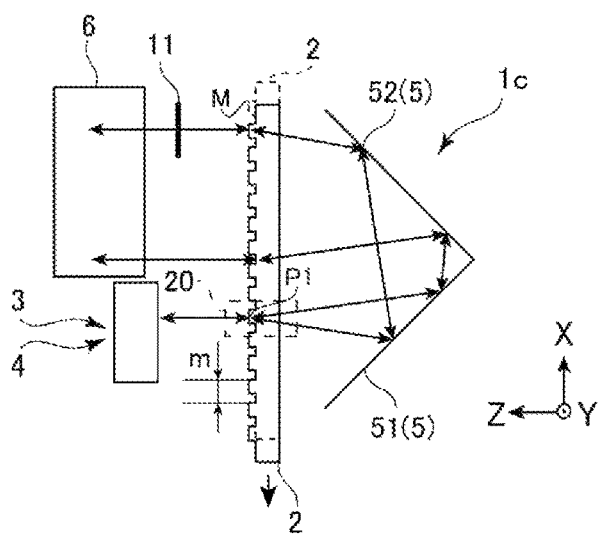

FIGS. 4A, 4B and 4C are schematic diagrams showing an optical path of the light when the optical displacement sensor 1*c* is a linear motion sensor.

Specifically, FIG. 4A shows a state prior to the object to be measured being moved in the measurement direction in the optical displacement sensor 1*c*. FIGS. 4B and 4C show a state in which the object to be measured has moved in the measuring direction in the optical displacement sensor 1*c*. FIGS. 4B and 4C represent the diffracting unit 2 at the position prior to the moving by a broken line.

In the first embodiment, the optical displacement sensor 1, 1*a*, 1*b* is an angle sensor; however, the optical displacement sensor 1*c* may be a linear motion sensor. In this case, the diffraction unit 2 is attached to the object to be measured that moves in the X direction, which is the measurement direction, and moves in synchronization with the movement of the object to be measured. The optical displacement sensor 1c detects the amount of displacement due to the movement of the object to be measured. The object to be measured may be disposed on the opposite side (the right side in the drawing sheet) to the diffraction unit 2 across the reflection unit 5, or it may be disposed on the opposite side (the left side in the drawing sheet) to the diffraction unit 2 across the fold-back reflection unit 6.

Hereinafter, the optical displacement sensor 1c will be described with reference to FIGS. 4A, 4B and 4C.

As shown in FIG. 4A, the light radiated from the light source 3 is split and diffracted into a first light ray and a second light ray at the splitting point P1 of the splitting unit 20 and radiated from the splitting point P1 into the first reflection part 51 of the reflection unit 5. At this time, as shown in FIG. 4B, if the object to be measured is moved in the +X direction (the upward direction in the drawing sheet), the diffraction unit 2 also moves in the +X direction in synchronization and the traveling directions of the first light ray and the second light ray also vary in response to the movement of the diffraction unit 2 in the +X direction. Further, as shown in FIG. 4C, if the object to be measured is moved in the −X direction (the downward direction in the drawing sheet), the diffraction unit 2 also moves in the −X direction in synchronization and the traveling directions of the first light ray and the second light ray also vary in response to the movement in the −X direction of the diffraction unit 2. Then, the first light ray and the second light ray that are diffracted four times by the diffraction unit 2 by going through the reflection unit 5 and the fold-back reflection unit 6 are radiated into the light-receiving unit 4 as composite light. The arithmetic unit calculates the amount of displacement due to the movement of the object to be measured based on the composite light received by the light-receiving unit 4.

Figure 5:
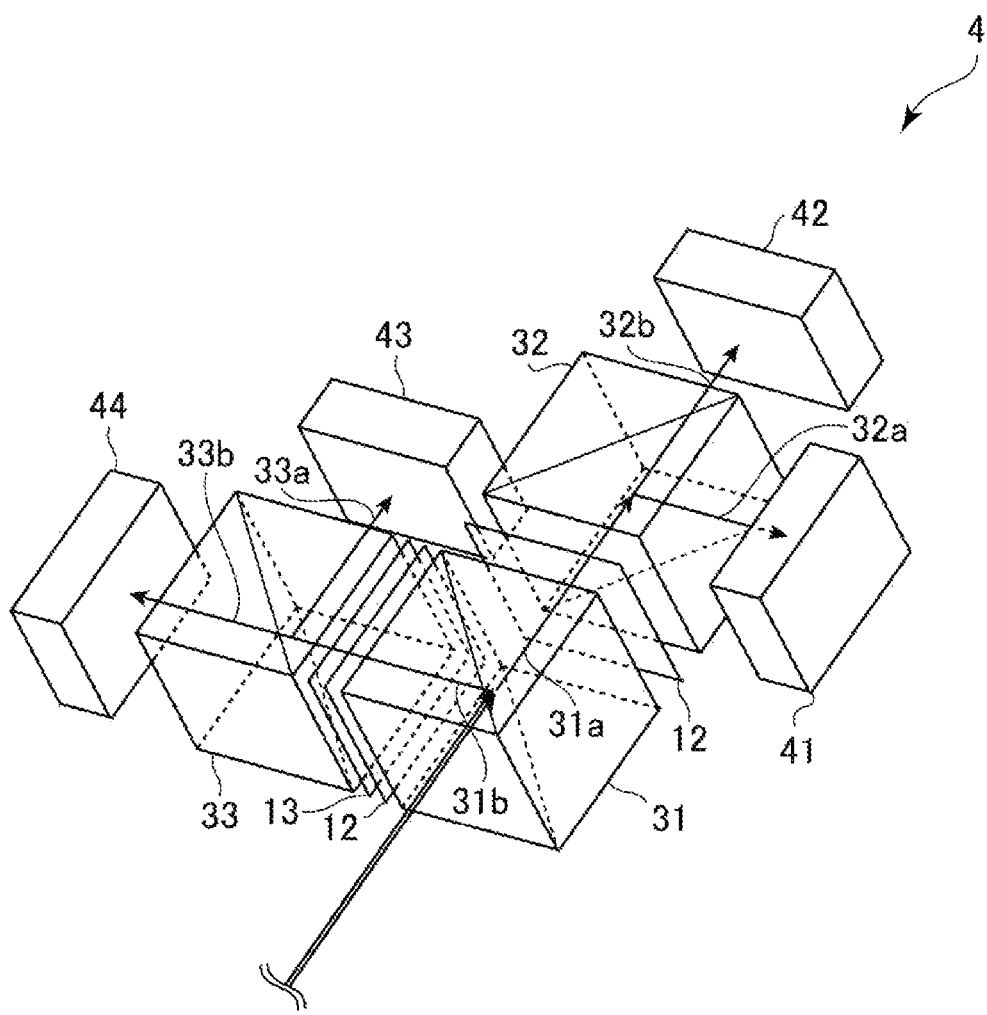
FIG. 5 is a schematic diagram showing a light-receiving unit in the optical displacement sensor.

FIG. 5 is a schematic diagram showing the light-receiving unit 4 in the optical displacement sensor 1, 1a to 1c.

As shown in FIGS. 1 to 4C, the optical displacement sensor 1, 1a to 1c includes a first quarter-wave plate 11 disposed: on an optical path of either the first light ray or the second light ray from the diffraction unit 2 to the reflection unit 5 and the fold-back reflection unit 6; or on a plurality of the above-described optical paths. In the present embodiment, the first quarter-wave plate 11 is disposed on the optical path of the first light ray between the diffraction unit 2 to the fold-back reflection unit 6. The first quarter-wave plate 11 may be disposed anywhere as long as it is: on an optical path of either the first light ray or the second light ray from the diffraction unit 2 to the reflection unit 5 and the fold-back reflection unit 6; or on a plurality of the above-described optical paths.

As shown in FIG. 5, the light-receiving unit 4 includes a second quarter-wave plate 12, a third quarter-wave plate 13, a split beam splitter 31, a first split light polarization beam splitter 32, a second split light polarization beam splitter 33, and a plurality of light-receiving parts 41 to 44.

Specifically, the split beam splitter 31 splits the composite light into first split light 31a and second split light 31b. A second quarter-wave plate 12 is disposed on each of the optical paths of the first split light 31a and the second split light 31b. The first split light polarization beam splitter 32 splits the first split light 31a that has gone through the second quarter-wave plate 12 into a first polarized light 32a and a second polarized light 32b. The third quarter-wave plate 13 is disposed on the optical path of the second split light 31b that has gone through the second quarter-wave plate 12. The second split light polarization beam splitter 33 splits the second split light 31b that has gone through the third quarter-wave plate 13 into a third polarized light 33a and a fourth polarized light 33b.

The first light-receiving part 41 receives light having a phase of 0 degrees from the first polarized light 32a. The second light-receiving part 42 receives light having a phase of 180 degrees from the second polarized light 32b. The third light-receiving part 43 receives light having a phase of 90 degrees from the third polarized light 33a. The fourth light-receiving part 44 receives light having a phase of 270 degrees from the fourth polarized light 33b.

The split beam splitter 31 is a non-polarization beam splitter. The split beam splitter 31 splits, as averaged non-polarized light, the composite light from the diffraction unit 2 into the first split light 31a and the second split light 31b.

The first split light polarization beam splitter 32 and the second split light polarization beam splitter 33 are optical components that respectively separate the split light 31a, 31b from the split beam splitter 31 into two polarization components: S-polarized light, which is the light of S-random polarization, and P-polarized light, which is the light of P-random polarization.

The first split light polarization beam splitter 32 reflects the first polarized light 32a, which is S-polarized light, and transmits the second polarized light 32b, which is P-polarized light. The second split light polarization beam splitter 33 reflects the third polarized light 33a, which is S-polarized light, and transmits the fourth polarized light 33b, which is P-polarized light. The present embodiment is described assuming that the second polarized light 32b and the fourth polarized light 33b are P-polarized light and the first polarized light 32a and the third polarized light 33a are S-polarized light; however, which polarized light is S-polarized light or P-polarized light is optional.

Hereinafter, the optical path of the light after the split beam splitter 31 will be described.

The first split light 31a becomes light having a phase shifted by 90 degrees from the first split light 31a by going through the second quarter-wave plate 12 and is radiated into the first split light polarization beam splitter 32. Such first split light 31a is polarized and split into the first polarized light 32a, which is S-polarized light, and the second polarized light 32b, which is P-polarized light. Then, the first light-receiving part 41 receives interference light, which is light having a phase of 0 degrees, by receiving the first polarized light 32a, and the second light-receiving part 42 receives interference light, which is light having a phase of 180 degrees, by receiving the second polarized light 32b.

The second split light 31b becomes light having a phase shifted by 280 degrees from the second split light 31 by going through the second quarter-wave plate 12 and the third quarter-wave plate 13 and is radiated into the second split light polarization beam splitter 33. Such second split light 31b is polarized and split into the third polarized light 33a, which is S-polarized light, and the fourth polarized light 33b, which is P-polarized light. Then, the third light-receiving part 43 receives interference light, which is light having a phase of 90 degrees, by receiving the third polarized light 33a, and the fourth light-receiving part 44 receives interference light, which is light having a phase of 270 degrees, by receiving the fourth polarized light 33b.

Accordingly, the optical displacement sensor 1, 1a to 1c is enabled to detect four-phase signals from the composite light and to detect the amount of displacement of the object to be measured with high precision.

Figure 6:
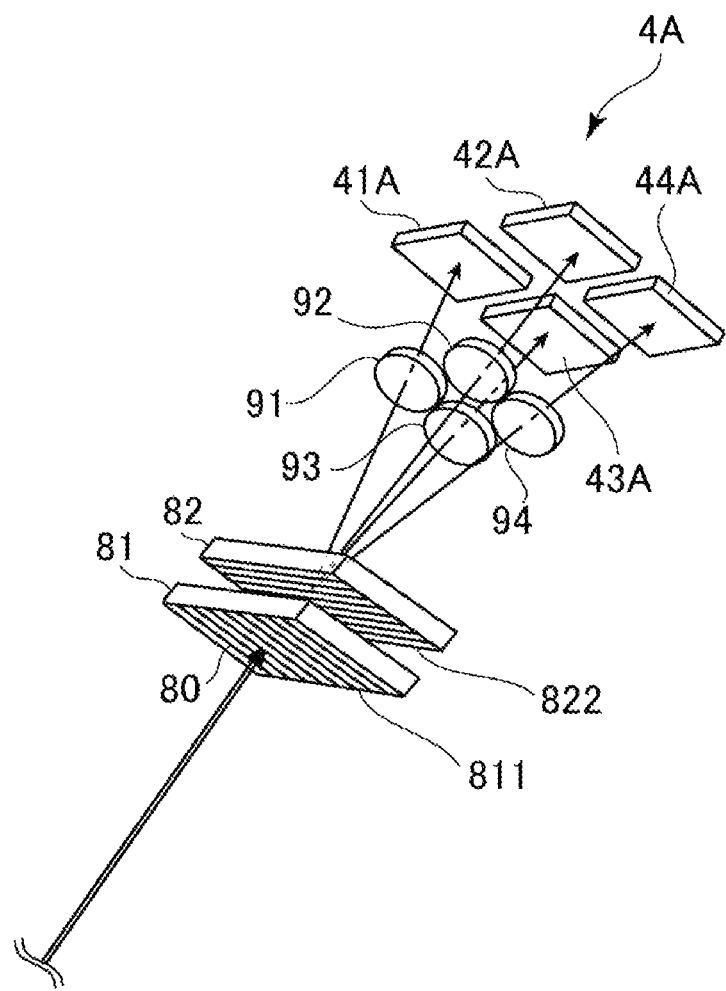
FIG. 6 is a schematic diagram showing a variation of the light-receiving unit in the optical displacement sensor.

FIG. 6 is a schematic diagram showing a variation of the light-receiving unit 4 in the optical displacement sensor 1, 1*a* to 1*c*.

The optical displacement sensor 1, 1*a* to 1*c* may employ, in addition to the light-receiving unit 4, a light-receiving unit 4A having the following configuration.

Specifically, as shown in FIG. 6, the light-receiving unit 4A differs from the light-receiving unit 4 in that it includes a second diffraction unit 81, a third diffraction unit 82, a plurality of polarizers 91 to 94, and a plurality of light-receiving parts 41A to 44A. The second diffraction unit 81 has a radiated surface 80 to which the composite light is radiated, and diffraction gratings 811, provided along a predetermined direction, for converting the composite light into a plurality of diffracted light rays. The third diffraction unit 82 has diffraction gratings 822 provided along a direction orthogonal to the predetermined direction along which the diffraction gratings 811 of the second diffraction unit 81 are provided on the radiated surface 80. The third diffraction unit 82 converts the plurality of diffracted light rays from the second diffraction unit 81 into a further plurality of diffracted light rays. The plurality of polarizers 91 to 94 are disposed on the optical paths of the plurality of diffracted light rays from the third diffraction unit 82. The plurality of polarizers 91-94 convert the plurality of diffracted light rays into a plurality of polarized light rays, each having a different phase. The plurality of light-receiving parts 41A to 44A are respectively provided to the plurality of polarizers 91 to 94.

The second diffraction unit 81 and the third diffraction unit 82 split the composite light from the diffraction unit 2 into four diffracted light rays. The four diffracted light rays are averaged unpolarized light rays.

The polarizers 91 to 94 are polarizing lenses. Any component may be used as the polarizer 91 to 94 as long as it can polarize the incident light.

The light-receiving parts 41A to 44A are provided in the same plane that faces the plurality of polarizers 91 to 94. The plurality of diffracted light rays split by the second diffraction unit 81 and the third diffraction unit 82 become polarized light rays, each having a different phrase, by transmitting through the plurality of polarizers 91 to 94. Specifically, the first light-receiving part 41A receives light having a phase of 0 degrees through the first polarizer 91. The second light-receiving part 42A receives light having a phase of 90 degrees through the second polarizer 92. The third light-receiving part 43A receives light having a phase of 180 degrees through the third polarizer 93. The fourth light-receiving part 44A receives light having a phase of 270 degrees through the fourth polarizer 94.

The arithmetic unit acquires four-phase signals from the plurality of light rays, each having a different phase, received by the light-receiving parts 41A to 44A, and calculates the direction of movement and the amount of displacement of the object to be measured based on the four-phase signals.

With this configuration, the light-receiving parts 41A to 44A are provided in the same plane that faces the plurality of polarizers 91 to 94 and may therefore be modularized. Further, since the plurality of light-receiving parts 41 to 44 do not need to be provided for the respective positions where the light is radiated as in the aforementioned light-receiving unit 4, costs may be reduced as well as space may be saved.

The light-receiving units 4 and 4A are respectively provided with the plurality of light-receiving parts 41 to 44 and 41A to 44A to receive a plurality of light rays, and the arithmetic unit acquires the four-phase signals to calculate the amount of displacement of the object to be measured. However, any light-receiving unit may be employed as long as it can receive light that has gone through the diffraction unit, and the arithmetic unit may calculate the amount of displacement of the object to be measured in any manner as long as it can calculate, in association with the movement of the diffraction unit, the amount of displacement of the object to be measured based on the change in the interference signals arising from the composite signal received by the light-receiving unit.

Further, the optical displacement sensor 1, 1*a* to 1*c* includes the first quarter-wave plate 11; however, if, for example, the light-receiving unit 4, 4A is not employed, the first quarter-wave plate 11 may not need to be included.

The following operations and effects may be achieved according to such first embodiment.

(1) The diffraction unit 2 in the optical displacement sensor 1, 1*a* to 1*c* diffracts light a total of four times by causing the light to go through the fold-back reflection unit 6: when outputting the light incident from the light source 3 to the reflection unit 5, 5*a*, 5*b*; when outputting the light incident from the reflection unit 5, 5*a*, 5*b* to the fold-back reflection unit 6; when outputting the light incident from the fold-back reflection unit 6 to the reflection unit 5, 5*a*, 5*b*; and when outputting the light incident from the reflection unit 5, 5*a*, 5*b* to the light-receiving unit 4. The optical displacement sensor 1, 1*a* to 1*c* compensates for the variation in the travelling direction of the light due to the angular error in the reflection unit 5, 5*a*, 5*b*: by diffracting the light from the light source 3 four times by the diffraction unit 2; and by causing the first light ray and the second light ray, which have been reflected by the reflection unit 5, 5*a*, 5*b* to follow, by way of the fold-back reflection unit 6, the optical paths in a direction reverse from the direction in which the previous reflection occurred. This enables the optical displacement sensor 1, 1*a* to 1*c* to compensate for the deviation in optical paths of the first and second light rays and the variation in the radiated position in the light-receiving unit caused by the angular error in the reflection unit 5, 5*a*, 5*b*. The optical displacement sensor 1, 1*a* to 1*c* is enabled to suppress reduction in the amount of overlap in the composite light caused by the offset of the first light ray and the second light ray constituting the composite light radiated into the light-receiving unit 4.

Therefore, the optical displacement sensor 1, 1*a* to 1*c* is enabled to detect the amount of displacement of the object to be measured with high precision while stabilizing the amount of overlap in the composite light radiated into the light-receiving unit 4.

(2) The optical displacement sensor 1, 1*a* to 1*c* is enabled to deal with the first light ray and the second light ray with one reflection unit 5, 5*a*, 5*b* because the first light ray and the second light ray that are split by the splitting unit 20 and that have gone through the diffraction unit 2 are reflected from the first reflection part 51, 51*a*, 51*b* to the second reflection part 52, 52*a*, 52*b*, and the first light ray and the second light ray reflected by the fold-back reflection unit 6 are reflected from the second reflection part 52, 52*a*, 52*b* to the first reflection part 51, 51*a*, 51*b*.

Therefore, the optical displacement sensor 1, 1*a* to 1*c* is enabled to reduce the number of optical components corresponding to the light rays split by the splitting unit 20, and thereby costs may be reduced.

(3) There is no need to newly provide an optical component for splitting the light from the light source 3 since the splitting unit 20 corresponds to the diffraction gratings M included in the diffraction unit 2. Therefore, the diffraction gratings M of the diffraction unit 2 in the optical displacement sensor 1, 1a to 1c is enabled to be used also as the splitting unit 20, and thereby costs may be reduced.

Second Embodiment

Hereinafter, the second embodiment of the present invention will be described with reference to FIGS. 7 and 8. The parts already described will be denoted by the same reference numerals and the description thereof will be omitted in the following description.

Figure 7:
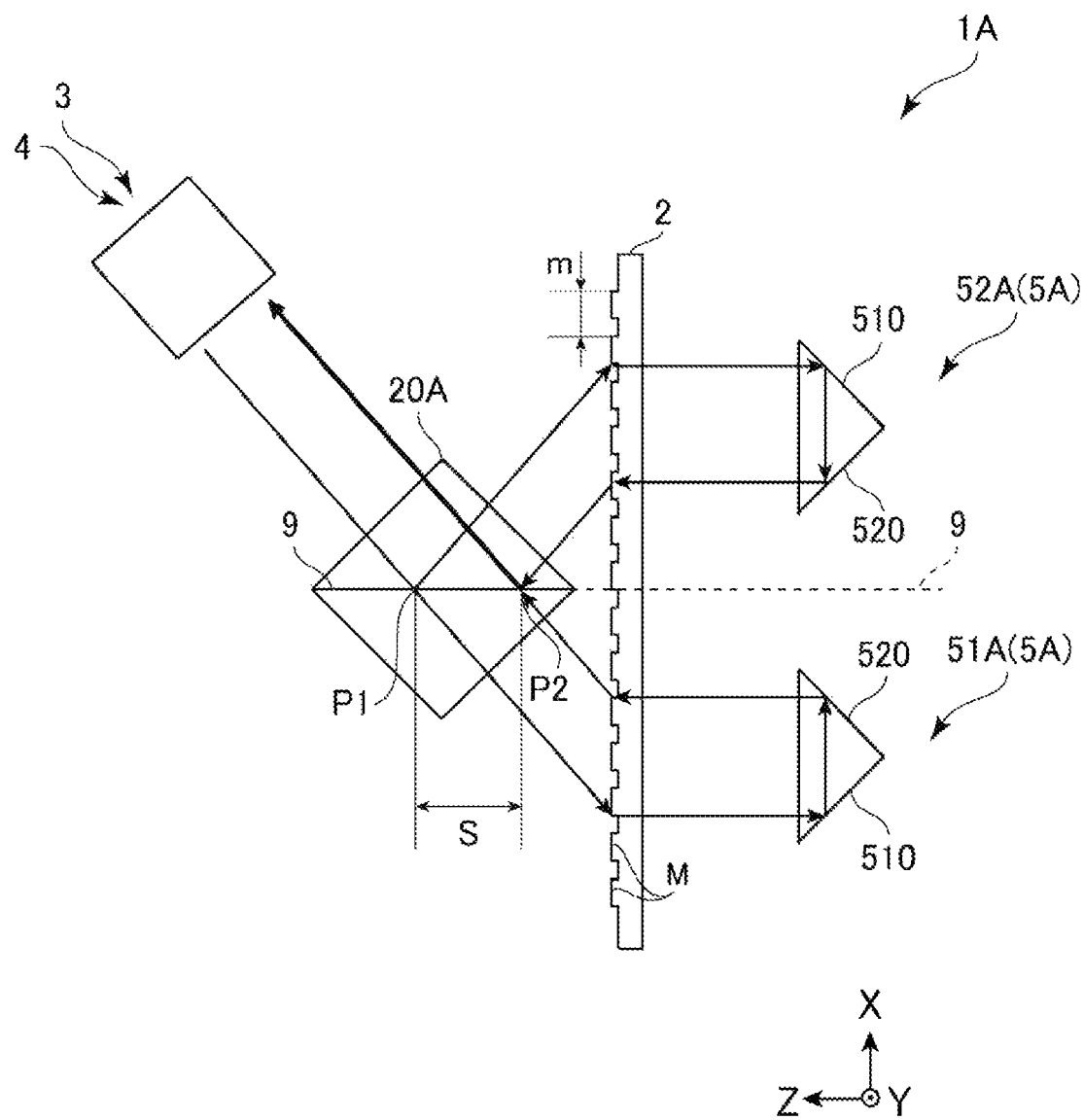
FIG. 7 is a schematic diagram showing an optical displacement sensor according to a second embodiment.

FIG. 7 is a schematic diagram showing an optical displacement sensor 1A according to the second embodiment.

In the first embodiment, the reflection unit 5, 5a, 5b in the optical displacement sensor 1, 1a to 1c reflects the first light ray and the second light ray that are split by the splitting unit 20 and that have gone through the diffraction unit 2 from the first reflection part 51, 51a, 51b to the second reflection part 52, 52a, 52b, and reflects the first light ray and the second light ray reflected by the fold-back reflection unit 6 from the second reflection part 52, 52a, 52b to the first reflection part 51, 51a, 51b. Further, the reflection unit 5, 5a, 5b is a prism, which is a single optical component.

The optical displacement sensor 1A in the second embodiment differs from the first embodiment in that the folded reflection unit 6 is not provided and that the reflection unit 5A includes a first reflection unit 51A and a second reflection unit 52A.

In the first embodiment, the splitting unit 20 corresponds to the diffraction gratings M included in the diffraction unit 2. Specifically, the optical displacement sensor 1, 1a to 1c employs, as the splitting unit 20, the diffraction grating M provided in an area where the light from the light source 3 is radiated, among the plurality of diffraction gratings provided in the diffraction unit 2.

In the second embodiment, the splitting unit 20A of the optical displacement sensor 1A differs from the first embodiment in that it is a beam splitter for splitting the light from the light source 3 into two light rays that are different from each other.

Specifically, the splitting unit 20A is a polarization beam splitter that separates the light from the light source 3 into two polarization components: S-polarized light, which is the light of S-random polarization, and P-polarized light, which is the light of P-random polarization. Then, the splitting unit 20A transmits the P-polarized light and reflects the S-polarized light.

As shown in FIG. 7, the splitting unit 20A splits the light radiated from the light source 3 at a predetermined splitting point P1 into a first light ray and a second light ray that is different from the first light ray. Further, the splitting unit 20A outputs each of the first light ray and second light ray in a direction that is plane symmetry with respect to the plane 9 including the splitting point P1. The plane 9 is orthogonal to the plane of the diffraction unit 2 on which the diffraction gratings M are arranged. The splitting unit 20A may employ either a polarization beam splitter or a non-polarization beam splitter, or even other optical components, as long as it can output each of the first light ray and the second light ray in a direction that is in plane symmetry with respect to the plane 9 including the splitting point P1.

The first reflection unit 51A includes a first reflection part 510 and a second reflection part 520 provided at a predetermined angle with respect to the first reflection part 510. The second reflection unit 52A is a separate member that is different from the first reflection unit 51A and includes a first reflection part 510 and a second reflection part 520 provided at the same angle as the predetermined angle in the first reflection unit 51A with respect to the first reflection part 510.

The first reflection unit 51A and the second reflection unit 52A are provided so that the first reflection parts 510 and the second reflection parts 520 are arranged in plane symmetry with respect to the plane 9 including the splitting point P1. The plane 9 is defined as the plane of symmetry.

The first reflection part 510 of the first reflection unit 51A receives one of the first light ray and the second light ray output from the splitting unit 20A and reflects the received light ray to the second reflection part 520 of the first reflection unit 51A. The first reflection part 510 of the second reflection unit 52A receives the other one of the first light ray and the second light ray output from the splitting unit 20A and reflects the received light ray to the second reflection part 520 of the second reflection unit 52A. The present embodiment will be described assuming that the light incident upon the first reflection unit 51A is the first light ray and the light incident upon the second reflection unit 52A is the second light ray. Further, the P-polarized light will be described as the first light ray and the S-polarized light will be described as the second light ray in the following description.

Figure 8:
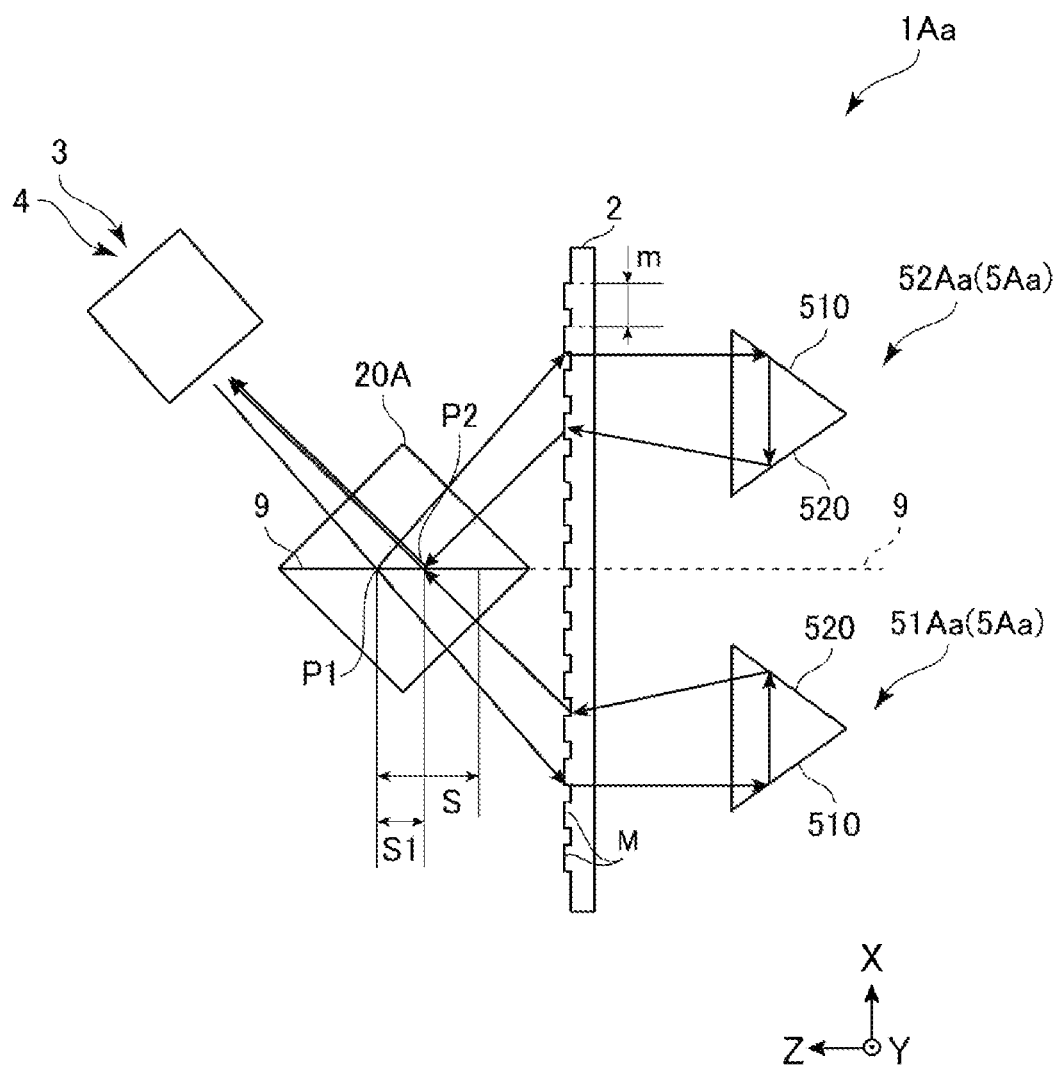
FIG. 8 is a schematic diagram showing an optical path of light when a reflection unit in the optical displacement sensor has an angle error.

FIG. 8 is a schematic diagram showing an optical path of the light when the reflection unit 5Aa in the optical displacement sensor 1Aa has an angular error. Specifically, the reflection unit 5Aa has an angular error resulting from the first reflection part 510 and the second reflection part 520 being connected at an acute angle α.

Hereinafter, the optical path of the light in the optical displacement sensor 1A, 1Aa will be described with reference to FIGS. 7 and 8.

As shown in FIGS. 7 and 8, first, the light radiated from the light source 3 is split into P-polarized light, which is the first light ray, and S-polarized light, which is the second light ray, at the splitting point P1 in the splitting unit 20A. The first light ray transmits through the splitting point P1 and is reflected to the diffraction unit 2. The second light ray is reflected at the splitting point P1 and is reflected to the diffraction unit 2.

Next, the first light ray diffracted by the diffraction unit 2 is reflected by the first reflection unit 51A in the parallel and reverse direction to re-enter the diffraction unit 2. Specifically, the first light ray is diffracted to the first reflection part 510 of the first reflection unit 51A. The first light ray reflected by the first reflection part 510 of the first reflection unit 51A is reflected by the second reflection part 520 of the first reflection unit 51A to be radiated into the diffraction unit 2.

Further, the second light ray diffracted by the diffraction unit 2 is reflected by the second reflection unit 52A in the parallel and reverse direction to re-enter the diffraction unit 2. Specifically, the second light ray is diffracted to the first reflection part 510 of the second reflection unit 52A. The second light ray reflected by the first reflection part 510 of the second reflection unit 52A is reflected by the second reflection part 520 of the second reflection unit 52A to be radiated into the diffraction unit 2.

The first light ray and the second light ray that have gone through the reflection unit 5A are diffracted by the diffraction unit 2 and become a composite light at a combining point P2 in the plane 9 of the splitting unit 20A to be radiated into the light-receiving unit 4. The arithmetic unit calculates the amount of displacement of the object to be measured based on the composite light received by the light-receiving unit 4.

Here, as shown in FIG. 7, if the reflection unit 5A does not have an angular error, a distance S is present between the splitting point P1 and the combining point P2. As shown in FIG. 8, if the reflection unit 5Aa is formed with an acute angle α and thus has an angular error, a distance S1 is present between the splitting point P1 and the combining point P2. The distance S1 is short relative to the distance S. The optical displacement sensor 1A, 1Aa is enabled to compensate for the effect caused by the angular error in the reflection unit 5A, 5Aa by moving the combining point P2 over the plane 9.

The following operations and effects may be achieved according to such second embodiment.

(4) The first reflection unit 51A, 51Aa and the second reflection unit 52A, 52Aa in the optical displacement sensor 1A, 1Aa are provided so that the first reflection parts 510 and the second reflection parts 520 are arranged in plane symmetry with respect to the plane 9 (i.e. the plane of symmetry) including the splitting point P1, and in each reflection unit, the first light ray and the second light ray are caused to follow the optical path to reflect from the first reflection part 510 to the second reflection part 520. This enables the optical displacement sensor 1A, 1Aa to compensate for the deviation in the optical paths of the first light ray and the second light ray and the variation in the radiated position in the light-receiving unit 4 due to the angular error common to the first reflection unit 51A, 51Aa and the second reflection unit 52A, 52Aa. Therefore, the optical displacement sensor 1A, 1Aa is enabled to detect the amount of displacement of the object to be measured with high precision while stabilizing the amount of overlap in the composite light radiated into the light-receiving unit 4.

(5) The optical displacement sensor 1A, 1Aa is enabled to suppress loss of light as compared with the case where the diffraction gratings M, corresponding to the splitting unit 20 in the first embodiment, are employed by employing a beam splitter for the splitting unit 20A, and the optical displacement sensor 1A, 1Aa is therefore enabled to detect the amount of displacement of the object to be measured with high precision.

Third Embodiment

Hereinafter, the third embodiment of the present invention will be described with reference to FIGS. 9 and 10. The parts already described will be denoted by the same reference numerals and the description thereof will be omitted in the following description.

Figure 9:
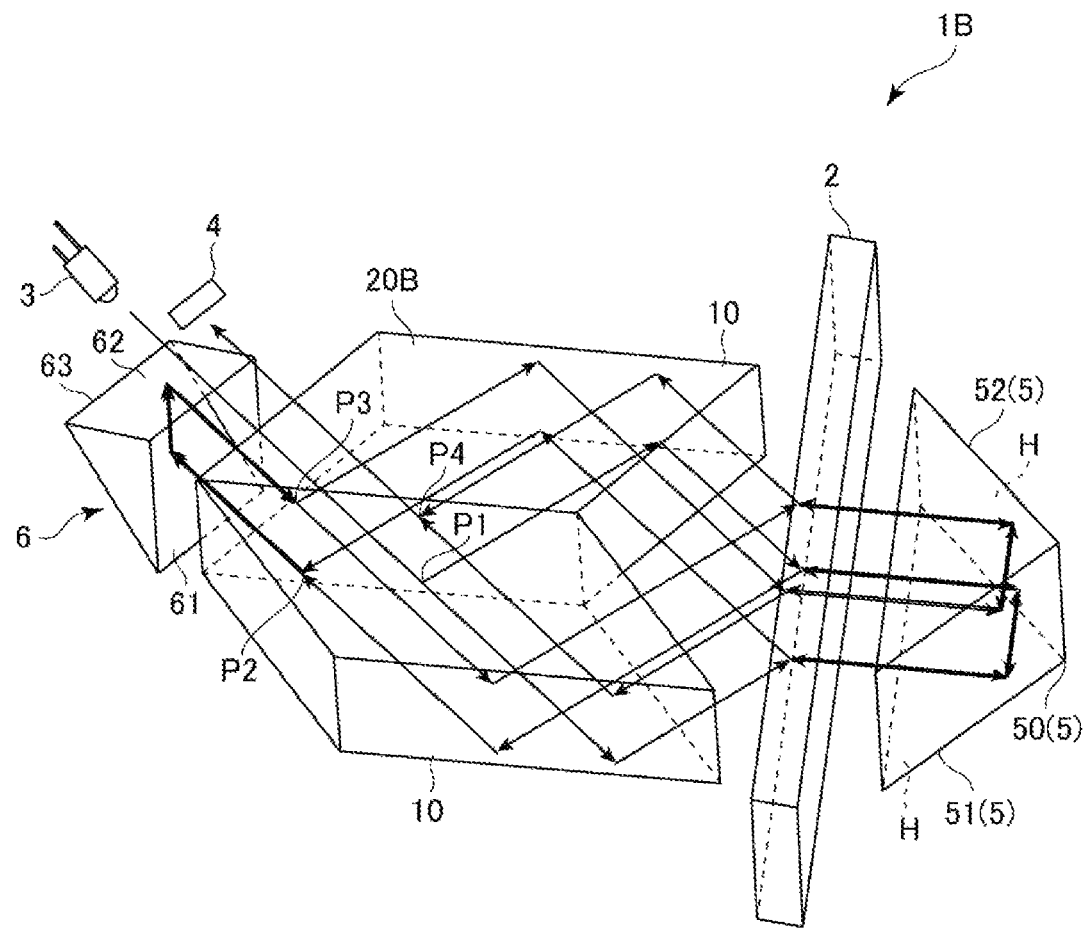
FIG. 9 is a perspective view showing an optical displacement sensor according to a third embodiment.

FIG. 9 is a perspective view showing an optical displacement sensor 1B according to the third embodiment.

As shown in FIG. 9, the third embodiment differs from the first embodiment in that the splitting unit 20B in the optical displacement sensor 1B is a polarization beam splitter as with the second embodiment, and it differs from the second embodiment in that the reflection unit 5 is a prism, which is a single optical component, as with the first embodiment.

In addition, the optical displacement sensor 1B differs from the first embodiment and the second embodiment in that it includes a total reflection unit 10 that totally reflects the first light ray and the second light ray in order to change the directions of the optical paths of the first light ray and the second light ray to predetermined directions.

Specifically, the total reflection unit 10 is a side face of the polarization beam splitter (i.e., the splitting unit 20B), and totally reflects the first light ray and the second light ray that are split by the splitting unit 20B to the diffraction unit 2 and/or totally reflects the first light ray and the second light ray that have gone through the diffraction unit 2 to the fold-back reflection unit 6. If, for example, the light does not undergo total reflection at the side face of the polarization beam splitter (i.e., the splitting unit 20B), the total reflection unit 10 may be a mirror, a half mirror, a beam splitter or any other optical component provided at a position where the optical paths of the first light ray and the second light ray can be changed, rather than the side face of the polarization beam splitter. In short, any component may be employed for the total reflection unit as long as it can totally reflect the first light ray and the second light ray to change the directions of the optical paths of the first light ray and the second light ray to predetermined directions.

Figure 10:
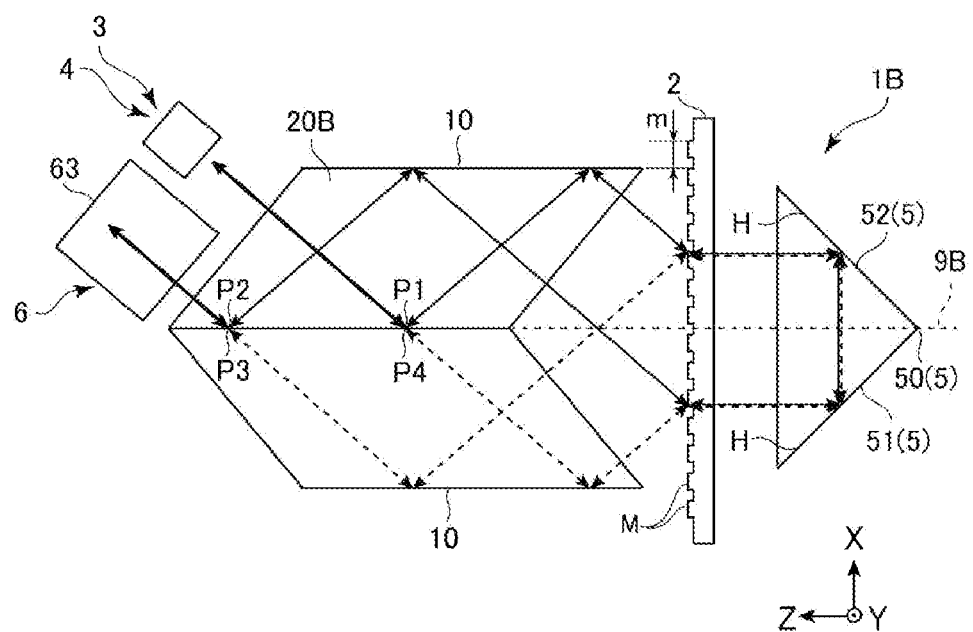
FIG. 10 is a schematic diagram showing an optical path of light in the optical displacement sensor.

FIG. 10 is a schematic diagram showing an optical path of the light in an optical displacement sensor 1B.

In the first embodiment, the connection part 50 of the reflection unit 5 is arranged so as to be parallel to the Y direction. As shown in FIG. 10, the first reflection part 51 and the second reflection part 52 in the reflection unit 5 of the third embodiment include reflection surfaces H for reflecting light. The reflection unit 5 includes the connection part 50 which is a first intersection line. The first intersection is a line along which extension surfaces obtained by extending the respective reflection surfaces H of the first reflection part 51 and the second reflection part 52 intersect one another. The connection part 50, being the first intersection line, differs from the first embodiment in that it is arranged on a plane 9B including the splitting points P1, P3 and the combining points P2, P4.

As shown in FIG. 9, the fold-back reflection unit 6 in the third embodiment includes, specifically, a first reflection plate 61 for reflecting light, a second reflection plate 62 provided at a predetermined angle with respect to the first reflection plate 61, and a connection part 63 which is a second intersection line. The second intersection line is a line along which extension surfaces obtained by extending the respective first reflection plate 61 and second reflection plate 62 intersect one another. The fold-back reflection unit 6 is arranged parallel to the direction in which the connection part 63, being the second intersection line, is orthogonal to the connection part 50, being the first intersection line.

As shown in FIG. 10, the splitting unit 20B outputs each of the first light ray and the second light ray in a direction that is in plane symmetry with respect to the plane 9B including the splitting points P1, P3 and the combining points P2, P4, the plane 9B being orthogonal to the plane of the diffraction unit 2 on which the diffraction gratings M are disposed. The splitting unit 20B may employ either a polarization beam splitter or a non-polarization beam splitter, or even other optical components, as long as it can output each of the first light ray and the second light ray in a direction that is in plane symmetry with respect to the plane 9B including the splitting points P1, P3 and the combining points P2, P4, and as long as the first light ray and the second light ray do not interfere with each other in the diffraction unit 2.

The first light ray and the second light ray split by the splitting unit 20B follow substantially the same optical path as the optical path in the first reflection unit 51A and the second reflection unit 52A in the second embodiment via the reflection unit 5, which is a single optical component, and are radiated into the light-receiving unit 4. In other words, in the optical displacement sensor 1B, the two reflection units 5A (i.e., the first reflection unit 51A and the second reflection unit 52A) arranged in plane symmetry with respect to the plane 9 (i.e., the symmetry plane) in the second embodiment are superimposed on each other to be used as a single reflection unit 5 by arranging the connection part 50 (i.e., the first intersection line) on the plane 9B. This enables the optical displacement sensor 1B to reduce the number of reflection units while obtaining the same effects as those of the second embodiment, and thereby costs may be reduced. Further, the optical displacement sensor 1B includes the fold-back reflection unit 6 as in the first embodiment and each of the first light ray and the second light ray may therefore be diffracted four times by the diffraction unit 2 by going through the fold-back reflection unit 6. Accordingly, the optical displacement sensor 1B is enabled to stably detect the amount of displacement as compared with the optical displacement sensor 1A in the second embodiment.

Hereinafter, the optical path of the light in the optical displacement sensor 1B will be described with reference to FIG. 10. For convenience of description, the broken line represents the P-polarized light and the solid line represents the S-polarized light in FIG. 10.

As shown in FIG. 10, the light radiated from the light source 3 is split into P-polarized light, which is the first light ray, and S-polarized light, which is the second light ray, at the splitting point P1 in the splitting unit 20B. The first light ray transmits through the splitting point P1 and is reflected to the diffraction unit 2 by the total reflection unit 10. The second light ray is reflected at the splitting point P1 and is further reflected to the diffraction unit 2 by the total reflection unit 10.

The first light ray and the second light ray reflected to the diffraction unit 2 are diffracted by the diffraction gratings M and output to the reflection unit 5. The first light ray is reflected from the first reflection part 51 to the second reflection part 52 and the second light ray is reflected from the second reflection part 52 to the first reflection part 51, and both the first light ray and the second light ray are reflected to the diffraction unit 2. Such first light ray and second light ray are diffracted by the diffraction gratings M, totally reflected by the total reflection unit 10 and combined at the combining point P2 in order to be radiated into the fold-back reflection unit 6.

The first light ray and the second light ray offset in the Y direction by going through the fold-back reflection unit 6 are split again at the splitting point P3 and totally reflected by the total reflection unit 10 in order to be radiated into the diffraction unit 2. The first light ray and the second light ray reflected to the diffraction unit 2 are diffracted by the diffraction gratings M and output to the reflection unit 5. The first light ray is reflected from the second reflection part 52 to the first reflection part 51 and the second light ray is reflected from the first reflection part 51 to the second reflection part 52, and both the first light ray and the second light ray are reflected to the diffraction unit 2. Such first light ray and second light ray are diffracted by the diffraction grating M, totally reflected by the total reflection unit 10 and combined at the combining point P4 in order to be radiated into the light-receiving unit 4 as composite light. The arithmetic unit calculates the amount of displacement of the object to be measured based on the composite light received by the light-receiving unit 4.

In addition to the same operations and effects as (1), (4) and (5) in the first embodiment and the second embodiment, the third embodiment may also achieve the following operations and effects.

(6) The optical path of the light in the optical displacement sensor 1B is enabled to be freely designed since the optical displacement sensor 1B includes the total reflection unit 10 for changing the directions of the optical paths of the first light ray and the second light ray to predetermined directions. Further, the size of the optical displacement sensor 1B may be reduced depending on the arrangement of the total reflection unit 10.

(7) The two reflection units 5A (i.e., the first reflection unit 51A and the second reflection unit 52A) that are required in the second embodiment may be replaced with a single reflection unit 5 since the connection part 50 of the reflection unit 5 is arranged on the plane 9B. Accordingly, costs may be reduced with the optical displacement sensor 1B.

(8) By including the fold-back reflection unit 6, the optical displacement sensor 1B causes the first light ray and the second light ray, which have been reflected once, to follow, by way of the fold-back reflection unit 6, the optical path in a direction reverse from the direction in which the previous reflection occurred. This enables the optical displacement sensor 1B to compensate for the deviation in the optical path of the light and the variation in the radiated position in the light-receiving unit due to the angular error in the reflection unit 5. The optical displacement sensor 1B is enabled to suppress reduction in the amount of overlap in the composite light caused by the offset of the first light ray and the second light ray constituting the composite light radiated into the light-receiving unit 4.

Therefore, the optical displacement sensor 1B is enabled to detect the amount of displacement of the object to be measured with high precision while stabilizing the amount of overlap in the composite light radiated into the light-receiving unit 4.

(9) If the connection part 63, being the second intersection line, is arranged parallel to the direction orthogonal to the connection part 50, being the first intersection line, the fold-back reflection unit 6 may cause the first light ray and the second light ray to be offset in a direction parallel to the connection part 50, being the first intersection line. This enables the optical displacement sensor 1B to prevent the interference between the incoming light and the outgoing light without requiring the light source 3 and the light-receiving unit 4 to be disposed at the same position. Further, the optical displacement sensor 1B is enabled to offset the first light ray and the second light ray in directions parallel to the connection part 50, being the first intersection line, in the reflection unit 5 and to cause them to be radiated into the diffraction unit 2 without introducing a new variation in the traveling directions of the first light ray and the second light ray. Therefore, the optical displacement sensor 1B is enabled to stabilize the composite light to be received by the light-receiving unit 4 and thereby, high precision may be achieved.

Fourth Embodiment

Hereinafter, the fourth embodiment of the present invention will be described with reference to FIG. 11. The parts already described will be denoted by the same reference numerals and the description thereof will be omitted in the following description.

Figure 11:
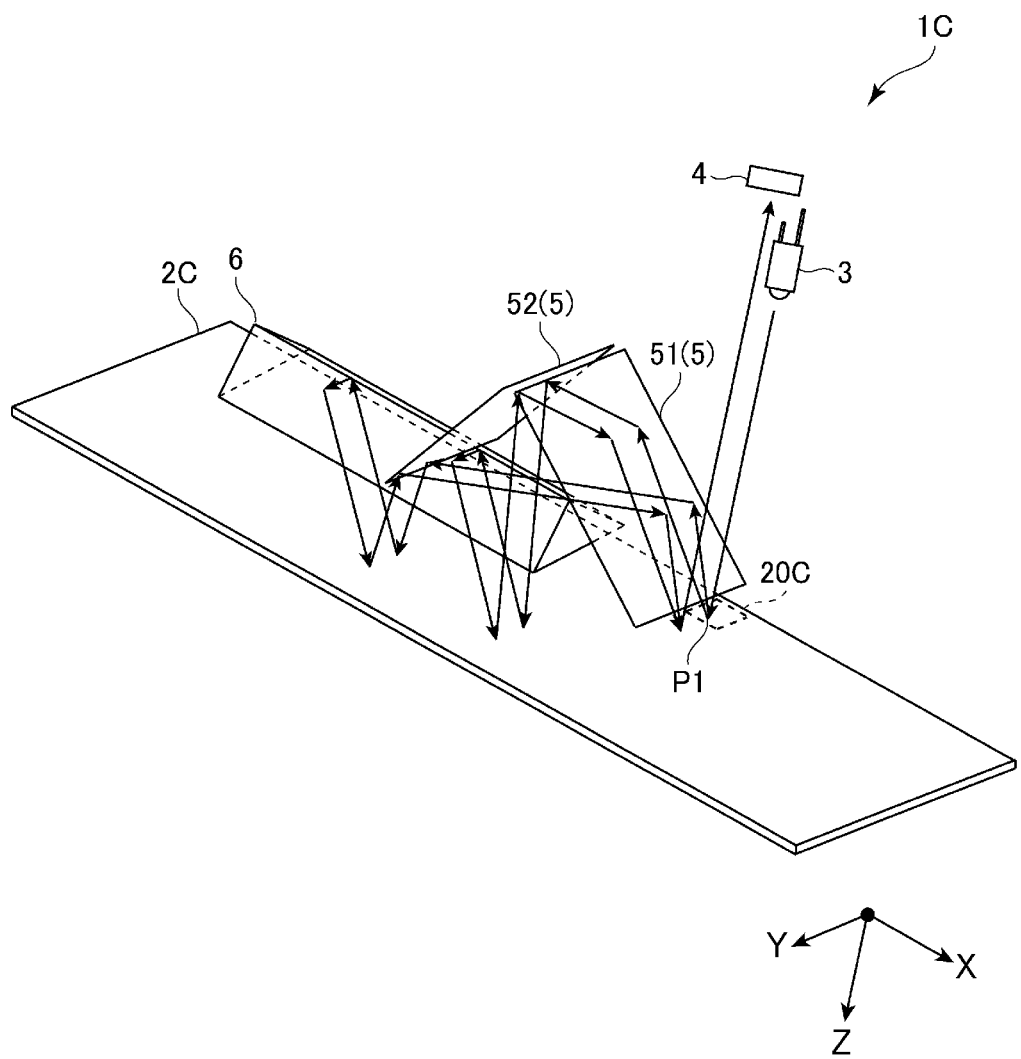
FIG. 11 is a perspective view showing an optical path of light in an optical displacement sensor according to a fourth embodiment.

FIG. 11 is a perspective view showing an optical path of the light in an optical displacement sensor 1C according to the fourth embodiment.

In the first embodiment, the diffraction unit 2 is of a transmissive type that diffracts and transmits the light from the light source 3.

By contrast, the diffraction unit 2C included in the optical displacement sensor 1C of the fourth embodiment differs from the first embodiment in that it is of a reflective type that diffracts and reflects the light from the light source 3. In the fourth embodiment, the optical displacement sensor 1C serves as a linear motion sensor for detecting the amount of movement of the object to be measured that moves in the measurement direction.

Hereinafter, the optical path of the light in the optical displacement sensor 1C will be described with reference to FIG. 11. For convenience of description, the diffraction gratings M are omitted in FIG. 11.

First, as shown in FIG. 11, the light radiated from the light source 3 is split and diffracted into a first light ray and a second light ray at the splitting point P1 in the splitting unit 20C and is radiated from the splitting point P1 to the first reflection part 51 of the reflection unit 5.

Next, the first reflection part 51 reflects the first light ray and the second light ray that are incident thereupon to the second reflection part 52. The second reflection part 52 reflects the first light ray and the second light ray that are incident thereupon to the diffracting unit 2C. The first light ray and the second light ray reflected by the second reflection part 52 are diffracted by the diffraction gratings M (see FIG. 12 to be described later) of the diffraction unit 2C and reflected to the fold-back reflection unit 6. The first light ray and the second light ray reflected by the diffraction unit 2C are offset in the Y direction by the fold-back reflection unit 6 and are retroreflected to the diffraction unit 2 in the directions parallel to and reverse from the directions of the respective first light ray and second light ray when they are reflected by the diffraction unit 2C.

The first light ray and the second light ray retroreflected by the fold-back reflection unit 6 are re-diffracted by the diffraction gratings M in the diffraction unit 2C and are reflected to the second reflection part 52 of the reflection unit 5. The second reflection part 52 reflects the first light ray and the second light ray that are incident thereupon to the first reflection part 51. The first reflection part 51 reflects the first light ray and the second light ray incident from the second reflection part 52 to the diffracting unit 2C. The first light ray and the second light ray reflected by the first reflection part 51 are diffracted and combined into composite light by the diffraction gratings M in the diffraction unit 2C and the composite light is reflected to the light-receiving unit 4. The light-receiving unit 4 receives the composite light consisting of the first light ray and second light ray that have gone through the reflection unit 5 and the fold-back reflection unit 6. The arithmetic unit calculates the amount of movement of the object to be measured based on the composite light received by the light-receiving unit 4.

In addition to the same operations and effects as those of the first embodiment, the fourth embodiment may also achieve the following operations and effects.

(10) By being of a reflective type, the diffraction unit 2C enables the optical displacement sensor 1C to serve effectively as a linear motion sensor. Further, by being of a reflective type, the diffraction unit 2C allows for the easy designing of the optical displacement sensor 1C relative to the case where the diffraction unit 2C is of a transmissive type from the viewpoint of ease of designing the equipment, such as optical components to be attached.

Fifth Embodiment

Hereinafter, the fifth embodiment of the present invention will be described with reference to FIG. 12. The parts already described will be denoted by the same reference numerals and the description thereof will be omitted in the following description.

Figure 12:
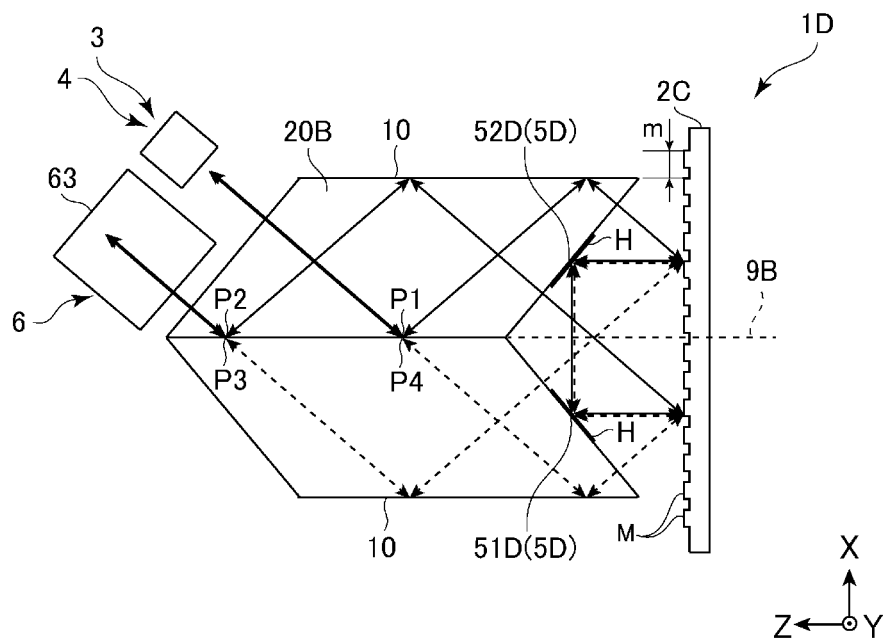
FIG. 12 is a perspective view showing an optical displacement sensor according to a fifth embodiment.
Figure 13:
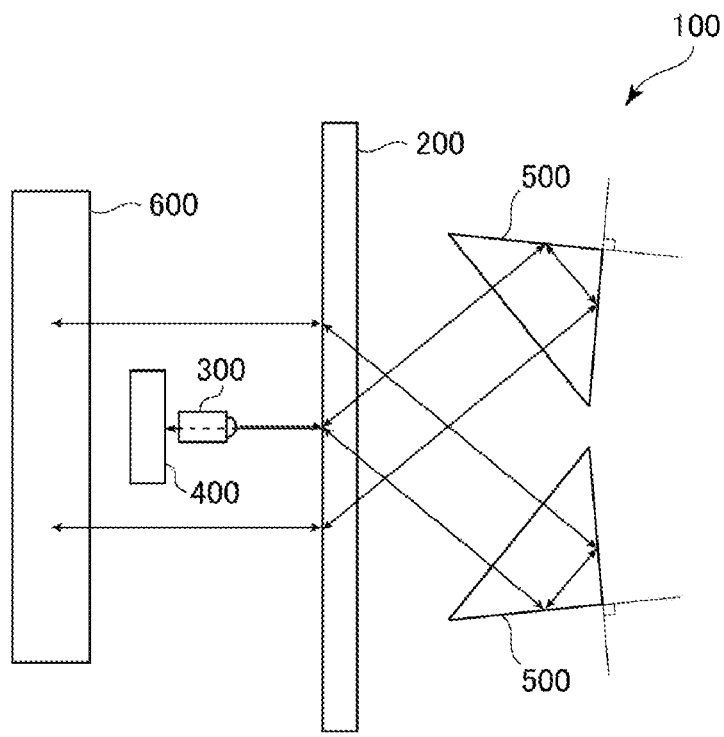
FIG. 13 is a schematic diagram showing an optical path of light in a conventional optical displacement sensor.
Figure 14A:
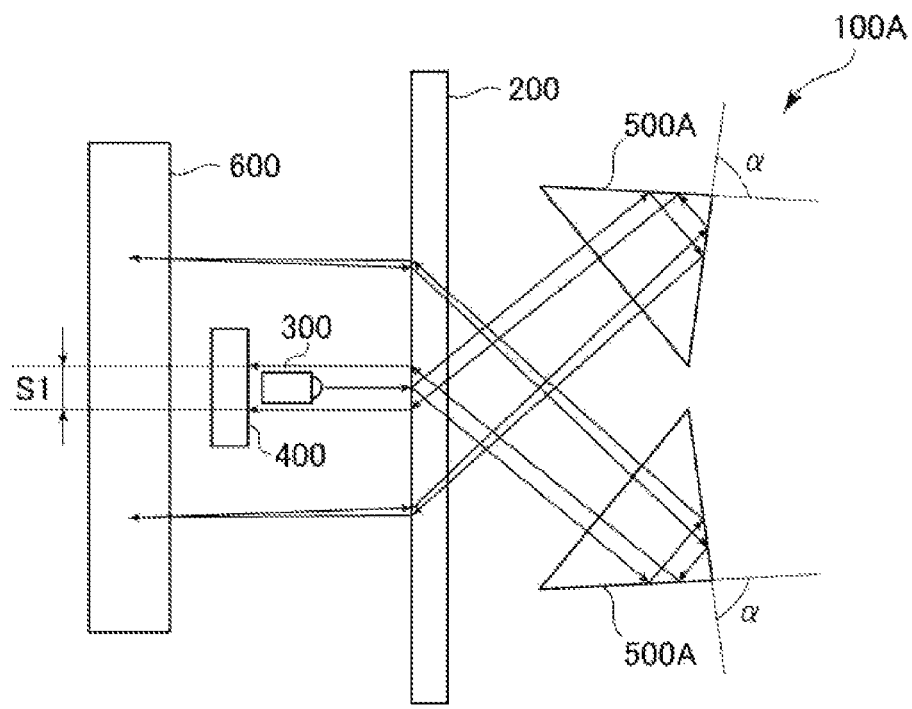
FIGS. 14A and 14B are schematic diagrams showing an optical path of light when two prisms in a conventional optical displacement sensor have angular errors.
Figure 14B:
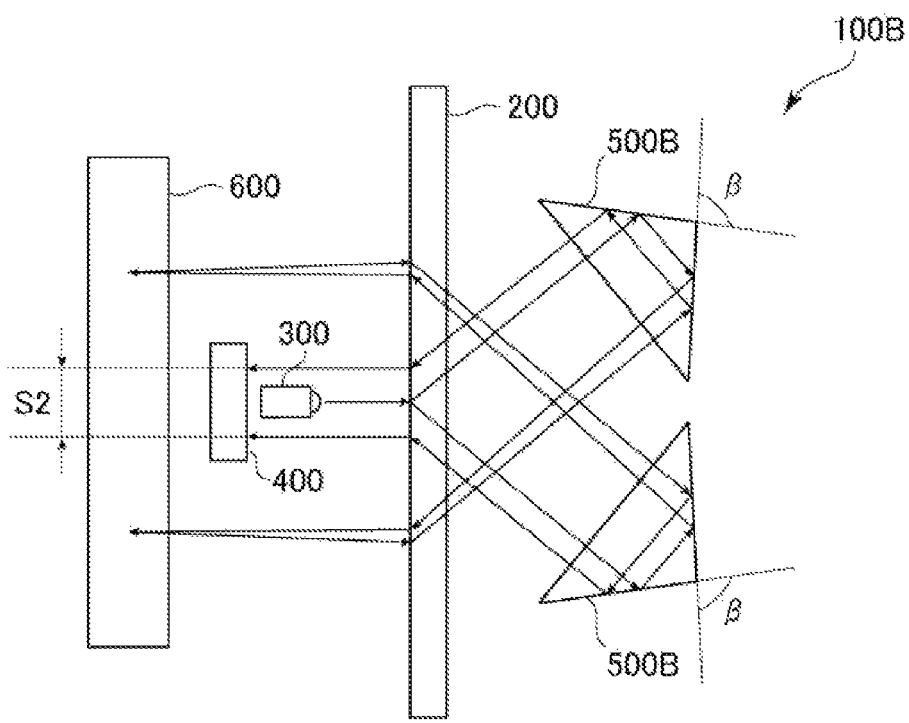

FIG. 12 is a perspective view showing an optical displacement sensor according to the fifth embodiment.

In the third embodiment, the diffraction unit 2 is of a transmissive type that diffracts and transmits the light from the light source 3. Further, the reflection unit 5, which is a single optical component, is disposed on the opposite side to the splitting unit 20B across the diffraction unit 2.

By contrast, the diffraction unit 2C included in the optical displacement sensor 1D of the fifth embodiment differs from the third embodiment in that it is of a reflective type that diffracts and reflects the light from the light source 3 as in the fourth embodiment.

Further, the reflection unit 5D in the fifth embodiment is not a single optical component and includes reflection surfaces H. When compared with the third embodiment, the first reflection part 51D and the second reflection part 52D differ in that they are disposed so as to be in plane symmetry with respect to the plane on which the diffraction gratings M in the diffraction unit 2, 2C are arranged. Specifically, the first reflection part 51D and the second reflection part 52D are plate-shaped mirrors and are provided at positions that do not inhibit light passing through the splitting unit 20B. In the fifth embodiment, the optical displacement sensor 1D serves as a linear motion sensor for detecting the amount of movement of the object to be measured that moves in the measurement direction. The first reflection part 51D and the second reflection part 52D may not need to be plate-shaped mirrors and thin film-shaped reflecting members may be employed, and, in fact, any reflecting member may be employed as long as it can reflect light in a predetermined direction.

Hereinafter, the optical path of the light in the optical displacement sensor 1D will be described with reference to FIG. 12. For convenience of description, the broken line represents the P-polarized light and the solid line represents the S-polarized light in FIG. 12.

As shown in FIG. 12, the light radiated from the light source 3 is split into P-polarized light, which is the first light ray, and S-polarized light, which is the second light ray, at the splitting point P1 in the splitting unit 20B. The first light ray transmits through the splitting point P1 and is reflected to the diffraction unit 2C by the total reflection unit 10. The second light ray is reflected at the splitting point P1 and is further reflected to the diffraction unit 2C by the total reflection unit 10.

The first light ray and the second light ray reflected to the diffraction unit 2C are diffracted by the diffraction gratings M and reflected to the reflection unit 5D. The first light ray is reflected from the first reflection part 51D to the second reflection part 52D and the second light ray is reflected from the second reflection part 52D to the first reflection part 51D, and both the first light ray and the second light ray are reflected again to the diffracting unit 2C. Such first light ray and second light ray are diffracted by the diffraction gratings M and reflected to the total reflection unit 10, and totally reflected by the total reflection unit 10 and combined at the combining point P2 in order to be radiated into the fold-back reflection unit 6.

The first light ray and the second light ray offset in the Y direction by going through the fold-back reflection unit 6 are split again at the splitting point P3 and totally reflected by the total reflection unit 10 in order to be radiated into the diffraction unit 2C. The first light ray and the second light ray reflected to the diffraction unit 2C are diffracted by the diffraction gratings M and reflected to the reflection unit 5D. The first light ray is reflected from the second reflection part 52D to the first reflection part 51D and the second light ray is reflected from the first reflection part 51D to the second reflection part 52D, and both the first light ray and the second light ray are reflected again to the diffracting unit 2C. Such first light ray and second light ray are diffracted by the diffraction gratings M and reflected to the total reflection unit 10, and are totally reflected by the total reflection unit 10 and combined at the combining point P4 in order to be radiated into the light-receiving unit 4 as composite light. The arithmetic unit calculates the amount of movement of the object to be measured based on the composite light received by the light-receiving unit 4.

The fifth embodiment may also achieve the same operations and effects as those of the third embodiment and the fourth embodiment.

Variations of the Embodiments

It should be noted that the present invention is not limited to any of the respective embodiments described above, and variations, improvements, and the like, that can achieve the object of the present invention are included in the present invention.

For example, in the respective embodiments described above, each of the optical displacement sensors 1, 1a to 1c, 1A, 1Aa, 1B, 1C, 1D is provided in the measuring apparatus. However, the optical displacement sensor may be provided in other apparatus instead of the measuring apparatus. Namely, the optical displacement sensor is not particularly limited as to where it is provided.

Therefore, for example, in the optical displacement sensor 1, 1a, 1b (which is an angle sensor) of the first embodiment, the object to be measured is disposed on the opposite side (the right side in the drawing sheets of FIGS. 2A to 2C) to the diffraction unit 2 across the reflection unit 5. However, the object to be measured may be disposed on the opposite side (the left side in the drawing sheets of FIGS. 2A to 2C) to the diffraction unit 2 across the fold-back reflection unit 6. In short, the object to be measured may be disposed at any location as long as it rotates around the Y-axis (i.e., the rotation axis) parallel to the Y-direction. Further, the optical displacement sensors 1A, 1B in the second embodiment and the third embodiment may be angle sensors or linear motion sensors.

In the respective embodiments described above, each of the optical displacement sensors 1, 1a to 1c, 1A, 1Aa, 1B, 1C, 1D detects the amount of displacement of the measuring object based on the plus and minus first order diffracted light rays. However, it is a design matter as to based on which light the optical displacement sensor detects the amount of displacement. In short, it is sufficient for the arithmetic unit to be able to calculate, in association with the movement of the diffraction unit, the amount of displacement of the object to be measured based on the composite light.

In the second embodiment, the splitting unit 20A is a polarization beam splitter; however, it may be a non-polarization beam splitter. In short, it is sufficient for the splitting unit to be a beam splitter for splitting the light from the light source into two light rays that are different from each other.

INDUSTRIAL APPLICABILITY

As described above, the present invention can be suitably applied to optical displacement sensors.

What is claimed is:
1. An optical displacement sensor comprising:
a diffraction unit having diffraction gratings arranged at a predetermined period along a measurement direction;
a light source that radiates light to the diffraction unit; and
a light-receiving unit that receives light that has gone through the diffraction unit, characterized in that the optical displacement sensor comprises:
a splitting unit that splits the light radiated from the light source into a first light ray and a second light ray that is different from the first light ray;
a reflection unit having a first reflection part that reflects the light radiated from the light source and a second reflection part provided at a predetermined angle with respect to the first reflection part; and
a fold-back reflection unit that folds-back and reflects the light that has gone through the reflection unit to the reflection unit,
wherein the reflection unit reflects the first light ray and the second light ray that are split by the splitting unit and have gone through the diffraction unit from the first reflection part to the second reflection part, and reflects the first light ray and the second light ray that are reflected by the fold-back reflection unit from the second reflection part to the first reflection part, and
wherein the light-receiving unit receives the first light ray and the second light ray that have gone through the reflection unit and the fold-back reflection unit.
2. The optical displacement sensor according to claim 1, characterized in that the splitting unit corresponds to the diffraction gratings included in the diffraction unit.
3. The optical displacement sensor according to claim 1, characterized in that the splitting unit is a beam splitter that splits the light from the light source into two light rays that are different from each other.
4. The optical displacement sensor according to claim 1, characterized in that the optical displacement sensor comprises a total reflection unit that totally reflects the first light ray and the second light ray in order to change directions of optical paths of the first light ray and the second light ray to predetermined directions.
5. The optical displacement sensor according to claim 1, characterized in that:
the optical displacement sensor comprises an arithmetic unit that calculates the amount of displacement of an object to be measured based on the light received by the light-receiving unit;
the diffraction unit is attached to the object to be measured that moves in the measurement direction and moves in synchronization with the movement of the object to be measured; and
the arithmetic unit calculates, in association with the movement of the diffraction unit that moves in synchronization with the movement of the object to be measured, the amount of displacement due to the movement of the object to be measured detected from the light received by the light-receiving unit.
6. The optical displacement sensor according to claim 1, characterized in that:
the optical displacement sensor comprises an arithmetic unit that calculates the amount of displacement of the object to be measured based on the light received by the light-receiving unit;
the diffraction unit is attached to the object to be measured that rotates around a predetermined axis, the predetermined axis being defined as a rotation axis, and rotates in synchronization with the rotation of the object to be measured; and
the arithmetic unit calculates, in association with the rotation of the diffraction unit that rotates in synchronization with the rotation of the object to be measured, the amount of angle displacement based on a change in phase detected from the light received by the light-receiving unit.

7. The optical displacement sensor according to claim 1, characterized in that the diffraction unit is of a transmissive type that diffracts and transmits the light from the light source.

8. The optical displacement sensor according to claim 1, characterized in that the diffraction unit is of a reflective type that diffracts and reflects the light from the light source.

9. An optical displacement sensor comprising:
a diffraction unit having diffraction gratings arranged at a predetermined period along a measurement direction;
a light source that radiates light to the diffraction unit; and
a light-receiving unit that receives light that has gone through the diffraction unit, characterized in that the optical displacement sensor comprises:
a splitting unit that splits the light radiated from the light source into a first light ray and a second light ray that is different from the first light ray at a predetermined splitting point, and that outputs each of the first light ray and the second light ray in a direction that is in plane symmetry with respect to a plane including the splitting point; and
a reflection unit having a first reflection part that reflects the light radiated from the light source and a second reflection part provided at a predetermined angle with respect to the first reflection part,
wherein the reflection unit comprises:
a first reflection unit including the second reflection part provided at a predetermined angle with respect to the first reflection part;
a second reflection unit that is different from the first reflection unit and that includes the second reflection part provided at the same angle as the predetermined angle in the first reflection unit with respect to the first reflection part,
wherein the first reflection unit and the second reflection unit are provided so that the first reflection parts and the second reflection parts are arranged in plane symmetry with respect to the plane including the splitting point, the plane being defined as a symmetry plane,
wherein the first reflection part of the first reflection unit is incident with one of the first light ray and the second light ray output from the splitting unit and reflects the incident light to the second reflection part of the first reflection unit,
wherein the first reflection part of the second reflection unit is incident with the other one of the first light ray and the second light ray output from the splitting unit and reflects the incident light to the second reflection part of the second reflection unit, and
wherein the light-receiving unit receives the first light ray and the second light ray that have gone through the first reflection unit and the second reflection unit.

10. The optical displacement sensor according to claim 9, characterized in that the optical displacement sensor comprises a fold-back reflection unit that folds-back and reflects the light that has gone through the reflection unit to the reflection unit.

11. The optical displacement sensor according to claim 10, characterized in that:
each of the first reflection part and the second reflection part includes a reflection surface that reflects light;
each of the first reflection unit and the second reflection unit has a first intersection line, the first intersection line being a line along which extension surfaces obtained by extending the respective reflection surfaces of the first reflection part and the second reflection part intersect one another;
the first intersection line of the first reflection unit and the first intersection line of the second reflection unit are arranged on the plane including the splitting point;
the fold-back reflection unit includes a first reflection plate that reflects the light, a second reflection plate provided at a predetermined angle with respect to the first reflection plate, and a second intersection line, the second intersection line being a line along which extension surfaces obtained by extending each of the first reflection plate and the second reflection plate intersect one another; and
the second intersection line is arranged parallel to a direction orthogonal to the first intersection line.

12. The optical displacement sensor according to claim 9, characterized in that the splitting unit corresponds to the diffraction gratings included in the diffraction unit.

13. The optical displacement sensor according to claim 9, characterized in that the splitting unit is a beam splitter that splits the light from the light source into two light rays that are different from each other.

14. The optical displacement sensor according to claim 9, characterized in that the optical displacement sensor comprises a total reflection unit that totally reflects the first light ray and the second light ray in order to change directions of optical paths of the first light ray and the second light ray to predetermined directions.

15. The optical displacement sensor according to claim 9, characterized in that:
the optical displacement sensor comprises an arithmetic unit that calculates the amount of displacement of an object to be measured based on the light received by the light-receiving unit;
the diffraction unit is attached to the object to be measured that moves in the measurement direction and moves in synchronization with the movement of the object to be measured; and
the arithmetic unit calculates, in association with the movement of the diffraction unit that moves in synchronization with the movement of the object to be measured, the amount of displacement due to the movement of the object to be measured detected from the light received by the light-receiving unit.

16. The optical displacement sensor according to claim 9, characterized in that:
the optical displacement sensor comprises an arithmetic unit that calculates the amount of displacement of the object to be measured based on the light received by the light-receiving unit;
the diffraction unit is attached to the object to be measured that rotates around a predetermined axis, the predetermined axis being defined as a rotation axis, and rotates in synchronization with the rotation of the object to be measured; and
the arithmetic unit calculates, in association with the rotation of the diffraction unit that rotates in synchronization with the rotation of the object to be measured, the amount of angle displacement based on a change in phase detected from the light received by the light-receiving unit.

17. The optical displacement sensor according to claim 9, characterized in that the diffraction unit is of a transmissive type that diffracts and transmits the light from the light source.

18. The optical displacement sensor according to claim 9, characterized in that the diffraction unit is of a reflective type that diffracts and reflects the light from the light source.

* * * * *